(12) United States Patent
Hersey

(10) Patent No.: US 6,938,350 B1
(45) Date of Patent: Sep. 6, 2005

(54) APPARATUS FOR PRODUCING A REFERENCE PLANE

(75) Inventor: William Hersey, Corte Madera, CA (US)

(73) Assignee: PLS_Pacific Laser Systems, Sausalito, CA (US)

(*) Notice: Subject to any disclaimer, the term of this patent is extended or adjusted under 35 U.S.C. 154(b) by 30 days.

(21) Appl. No.: 10/334,760

(22) Filed: Dec. 31, 2002

(51) Int. Cl.[7] ............................................. G01C 15/00
(52) U.S. Cl. ............................. 33/286; 33/276; 33/281; 33/DIG. 21
(58) Field of Search .................... 33/227–228, 276–277, 33/281–286, 290–291, DIG. 21, DIG. 1, 344, 345

(56) References Cited

U.S. PATENT DOCUMENTS

| | | | |
|---|---|---|---|
| 3,771,876 A | 11/1973 | Ljungdahl et al. | 356/138 |
| 3,822,943 A | 7/1974 | Mason | 356/138 |
| 3,964,824 A | 6/1976 | Dixon | 350/190 |
| 4,031,629 A | 6/1977 | Paluck | 33/290 |
| 4,111,564 A | 9/1978 | Trice, Jr. | 356/247 |
| 4,468,119 A | 8/1984 | Hamar | 356/152 |
| 4,471,530 A | 9/1984 | Kirven | 33/174 |
| 4,566,202 A | 1/1986 | Hamar | 33/286 |
| 4,830,489 A * | 5/1989 | Cain et al. | 356/73 |
| 4,836,669 A | 6/1989 | Teach | 350/618 |
| 4,854,703 A | 8/1989 | Ammann | 356/248 |
| 4,973,158 A | 11/1990 | Marsh | 356/247 |
| 4,993,161 A | 2/1991 | Borkovitz | 33/291 |
| 5,012,585 A | 5/1991 | DiMaggio | 33/286 |
| 5,144,486 A | 9/1992 | Hart | 359/629 |
| 5,144,487 A | 9/1992 | Hersey | 359/629 |
| 5,184,406 A | 2/1993 | Swierski | 33/227 |
| 5,218,355 A | 6/1993 | Burkhardt | 340/974 |
| 5,243,398 A | 9/1993 | Nielsen | 356/138 |
| 5,307,368 A | 4/1994 | Hamar | 372/107 |
| 5,430,549 A | 7/1995 | Anderson | 356/399 |
| 5,539,990 A | 7/1996 | Le | 33/283 |
| 5,552,886 A * | 9/1996 | Kitajima et al. | 33/DIG. 21 |
| 5,583,685 A | 12/1996 | Ohtomo et al. | 359/197 |
| 5,689,330 A | 11/1997 | Gerard et al. | 356/138 |
| 5,754,287 A | 5/1998 | Clarke | 356/250 |
| 5,898,809 A | 4/1999 | Toboada et al. | 385/115 |
| 5,907,907 A | 6/1999 | Ohtomo et al. | 33/291 |
| 6,065,217 A | 5/2000 | Dong | 33/290 |
| 6,087,645 A | 7/2000 | Kitajima et al. | 250/203.1 |
| 6,104,479 A | 8/2000 | Ohtomo et al. | 356/143 |
| 6,177,987 B1 | 1/2001 | Ting | 356/148 |
| 6,292,303 B1 | 9/2001 | Hamar | 359/641 |
| 6,314,650 B1 | 11/2001 | Falb | 33/286 |
| 6,539,638 B1 * | 4/2003 | Pelletier | 33/290 |
| 6,563,646 B1 * | 5/2003 | Litvin | 359/618 |
| 6,568,094 B2 * | 5/2003 | Wu | 33/281 |
| 6,763,596 B1 * | 7/2004 | Puri et al. | 33/286 |
| 2004/0012962 A1 * | 1/2004 | Wolf | 362/259 |

* cited by examiner

Primary Examiner—Diego Gutierrez
Assistant Examiner—Yaritza Guadalupe
(74) Attorney, Agent, or Firm—Fish & Richardson P.C.

(57) ABSTRACT

The present invention provides an apparatus and method for projecting a reference plane. The invention features emitting a light beam, splitting the light bean into two or more resulting beams, and converting the resulting beams into respective projected lines. The projected lines can be used to indicate a reference plane that substantially spans greater than 90 degrees from a reference point. The invention also features at least two lasers configured and arranged to emit a laser beam. An optical element corresponds to each laser to convert each laser beam into an output line that are projected to form only a single reference plane.

3 Claims, 20 Drawing Sheets

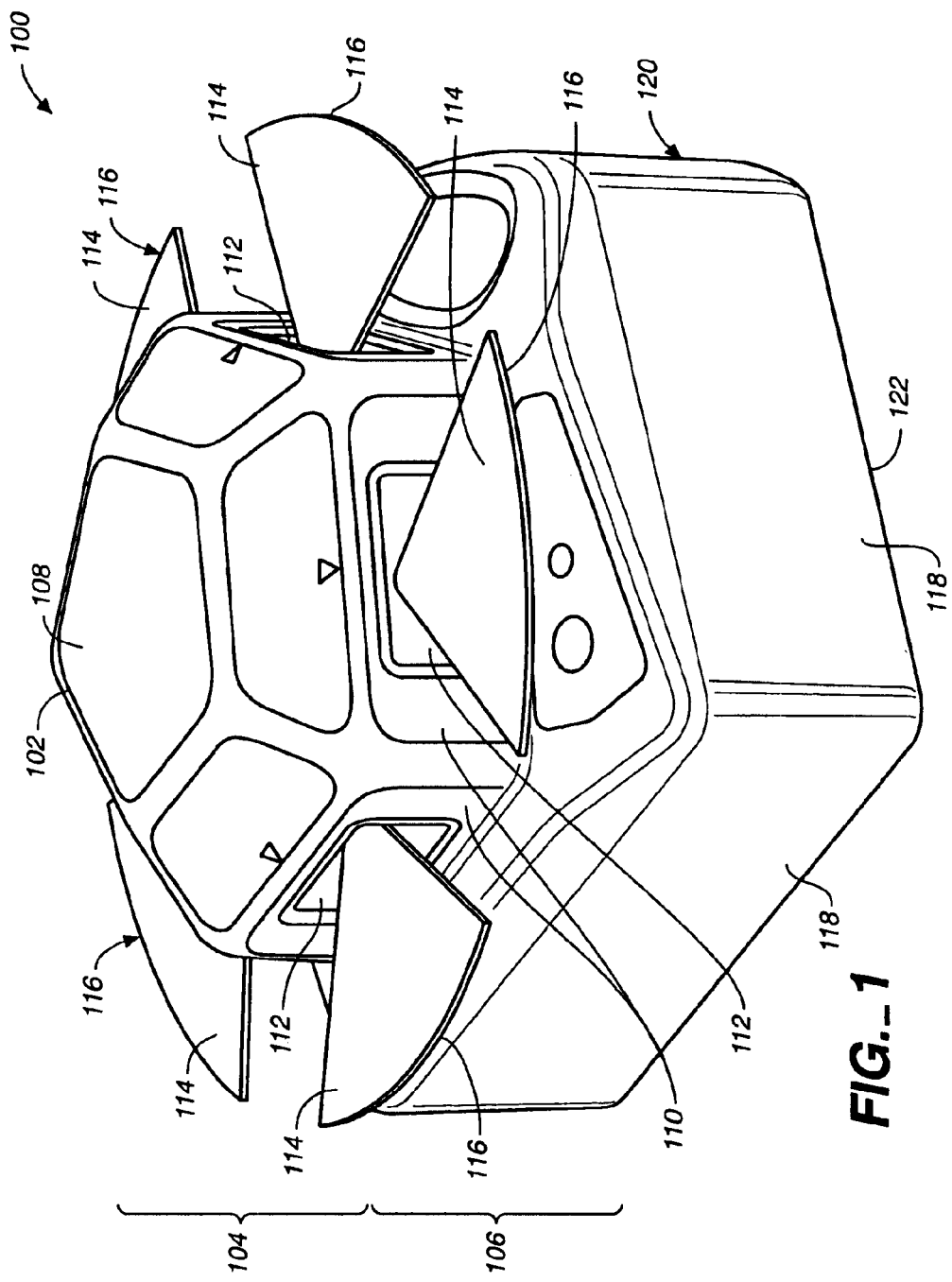

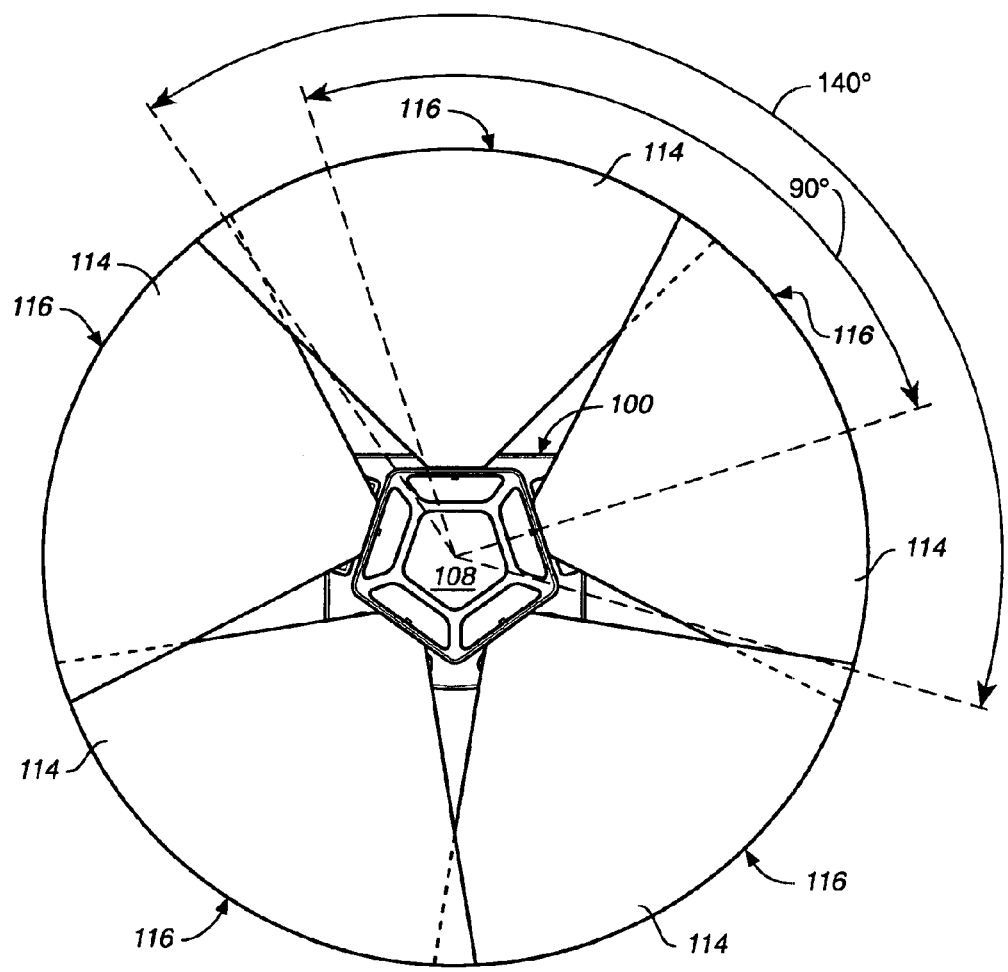
FIG._2A

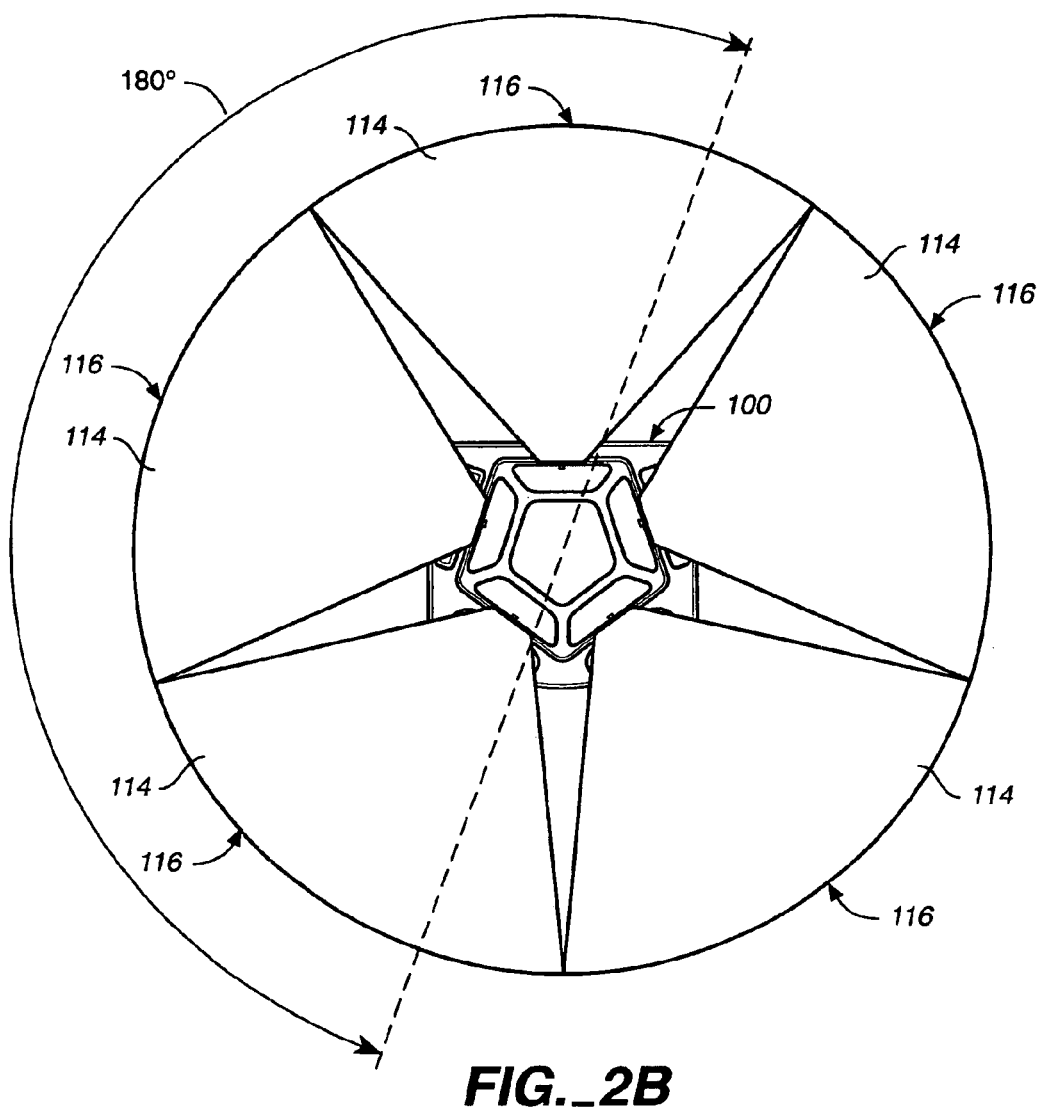
FIG._2B

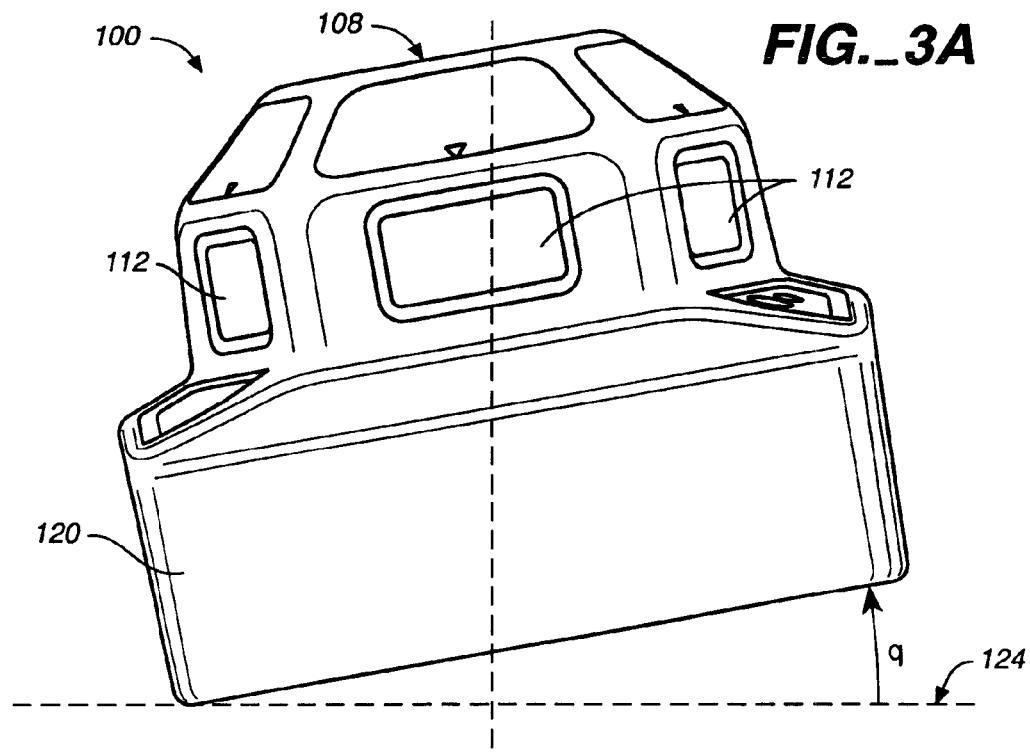
FIG._3A
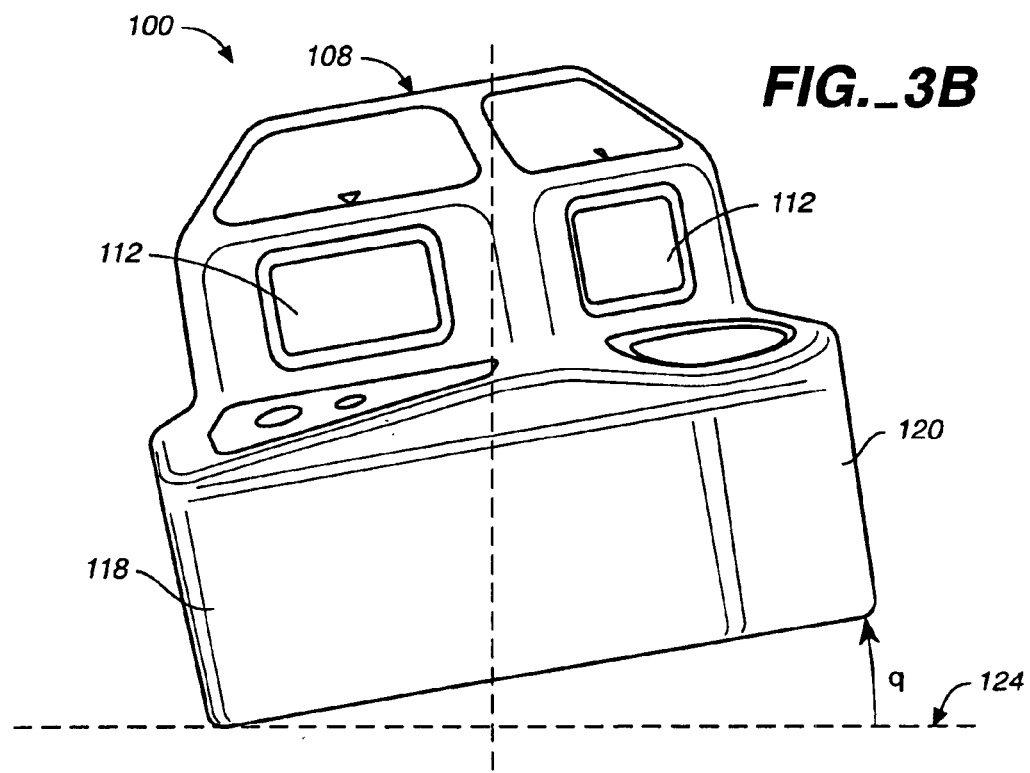
FIG._3B

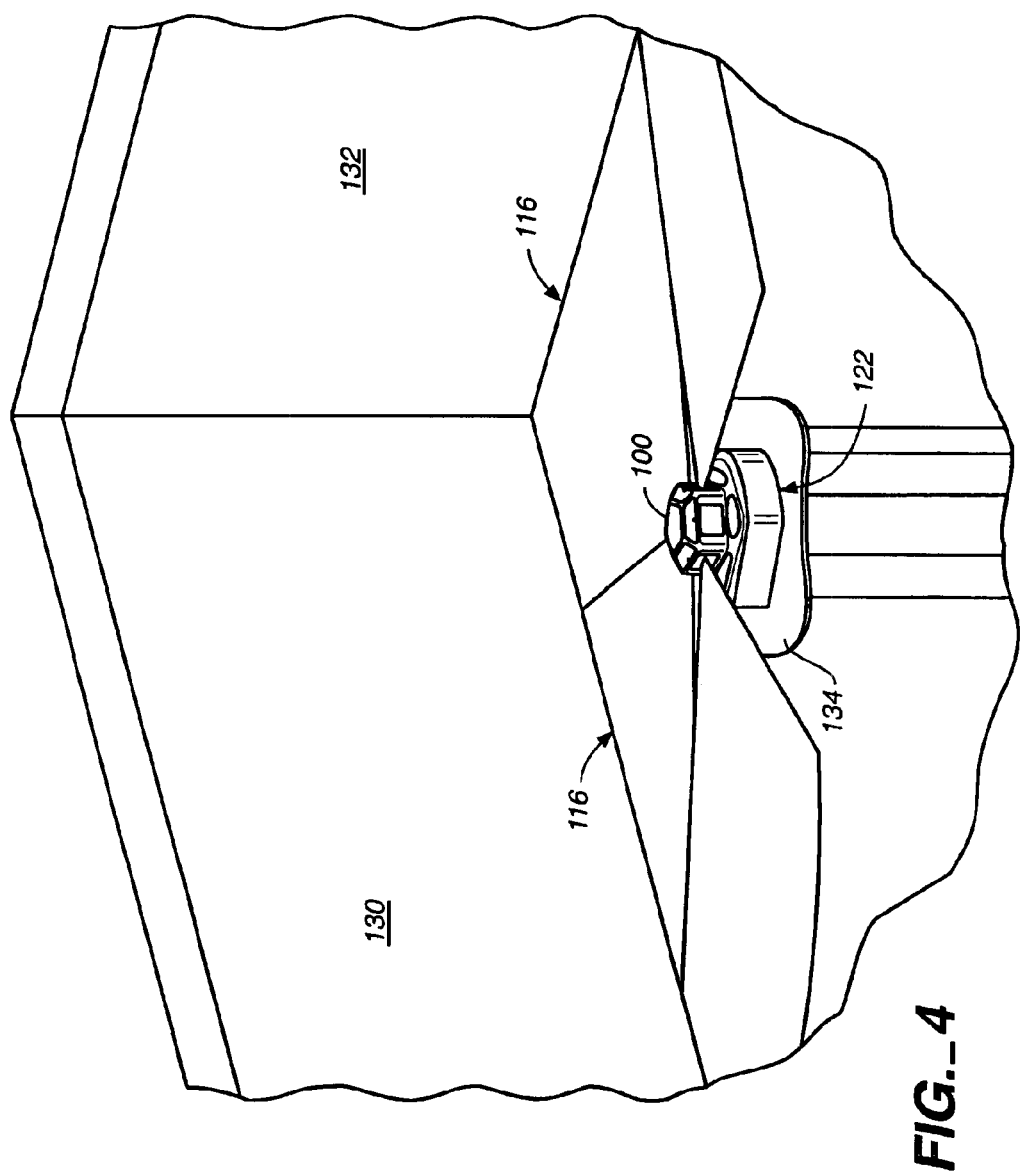
FIG._4

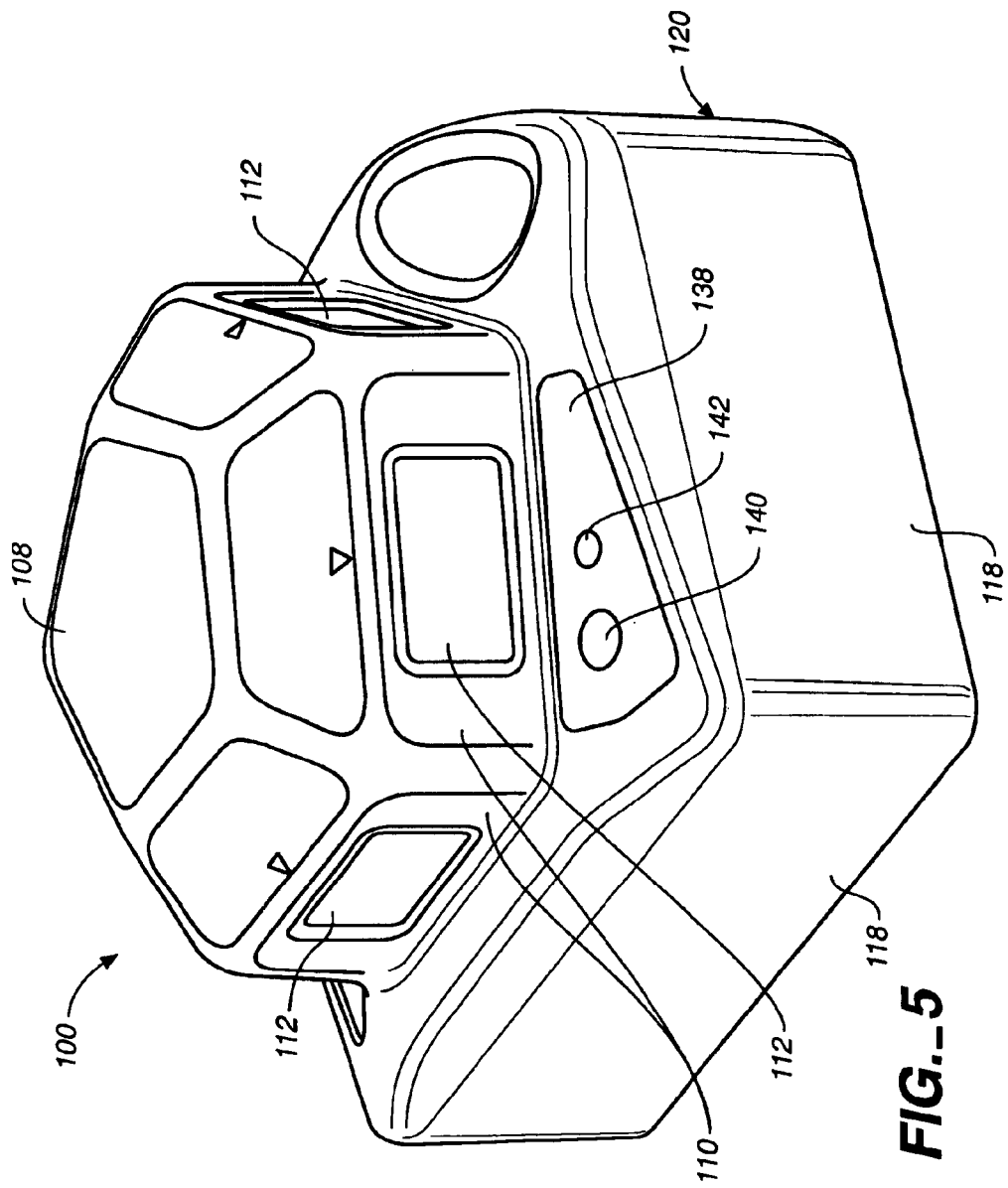
FIG._5

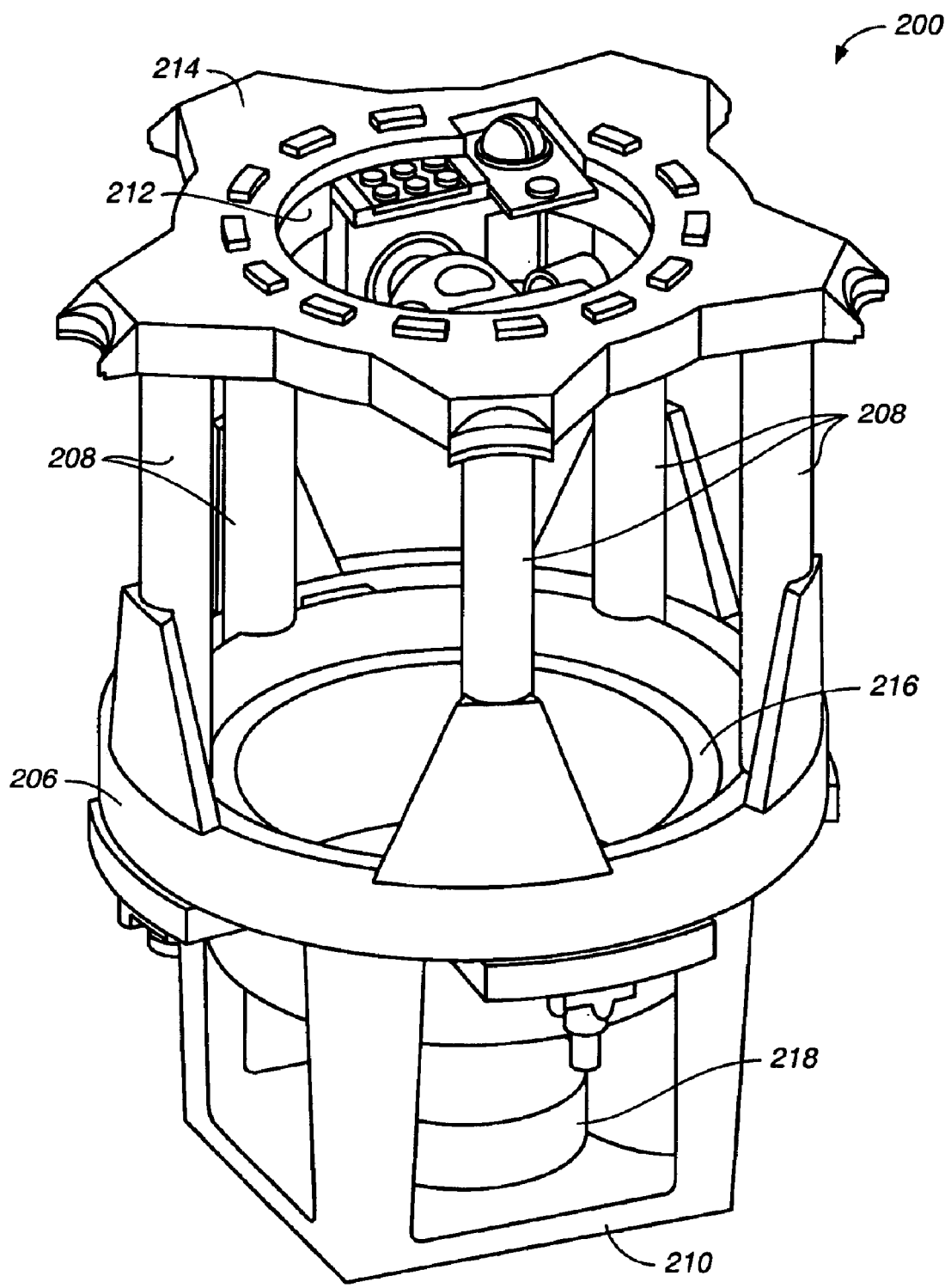
FIG._6

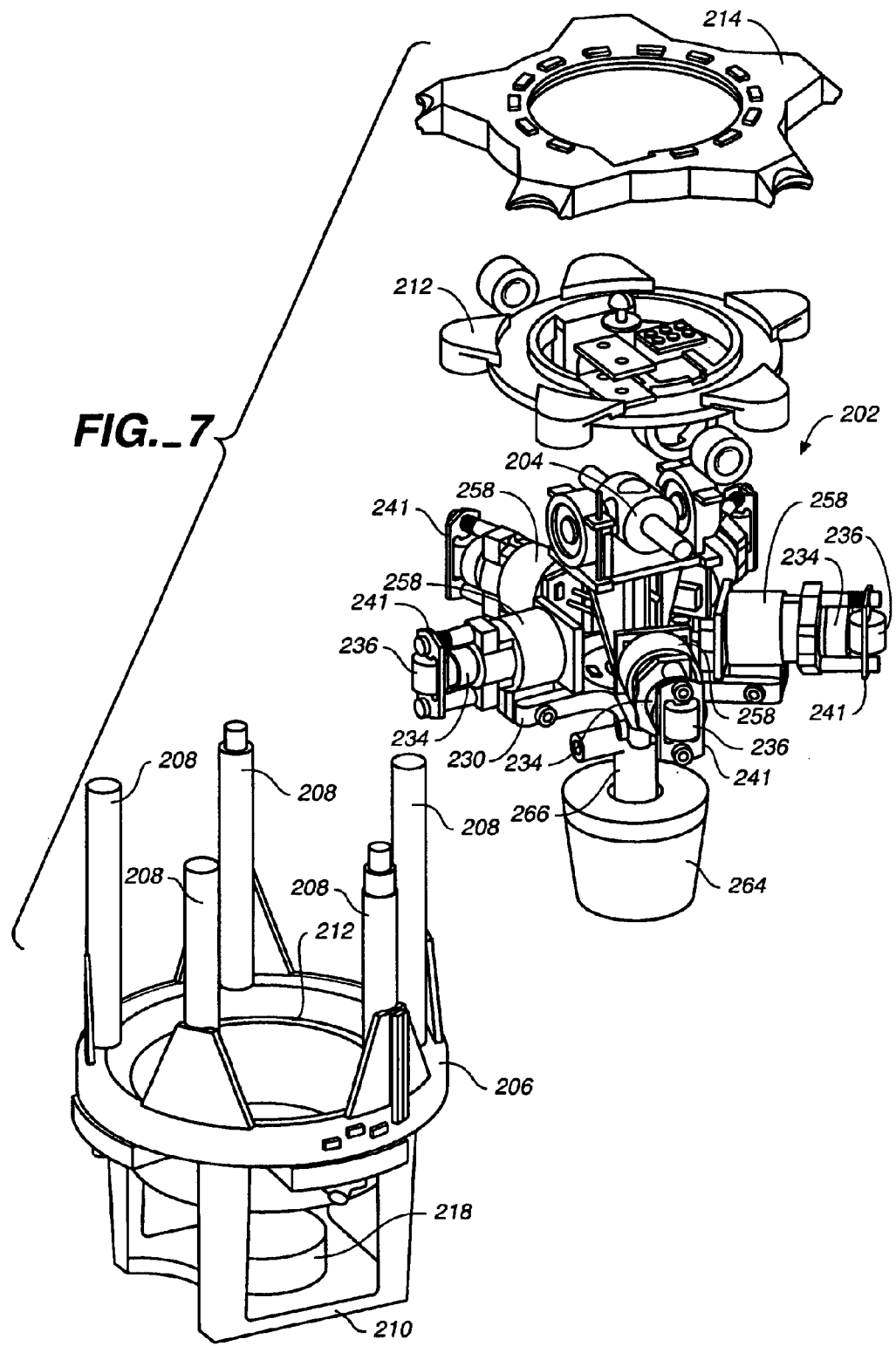
FIG._7

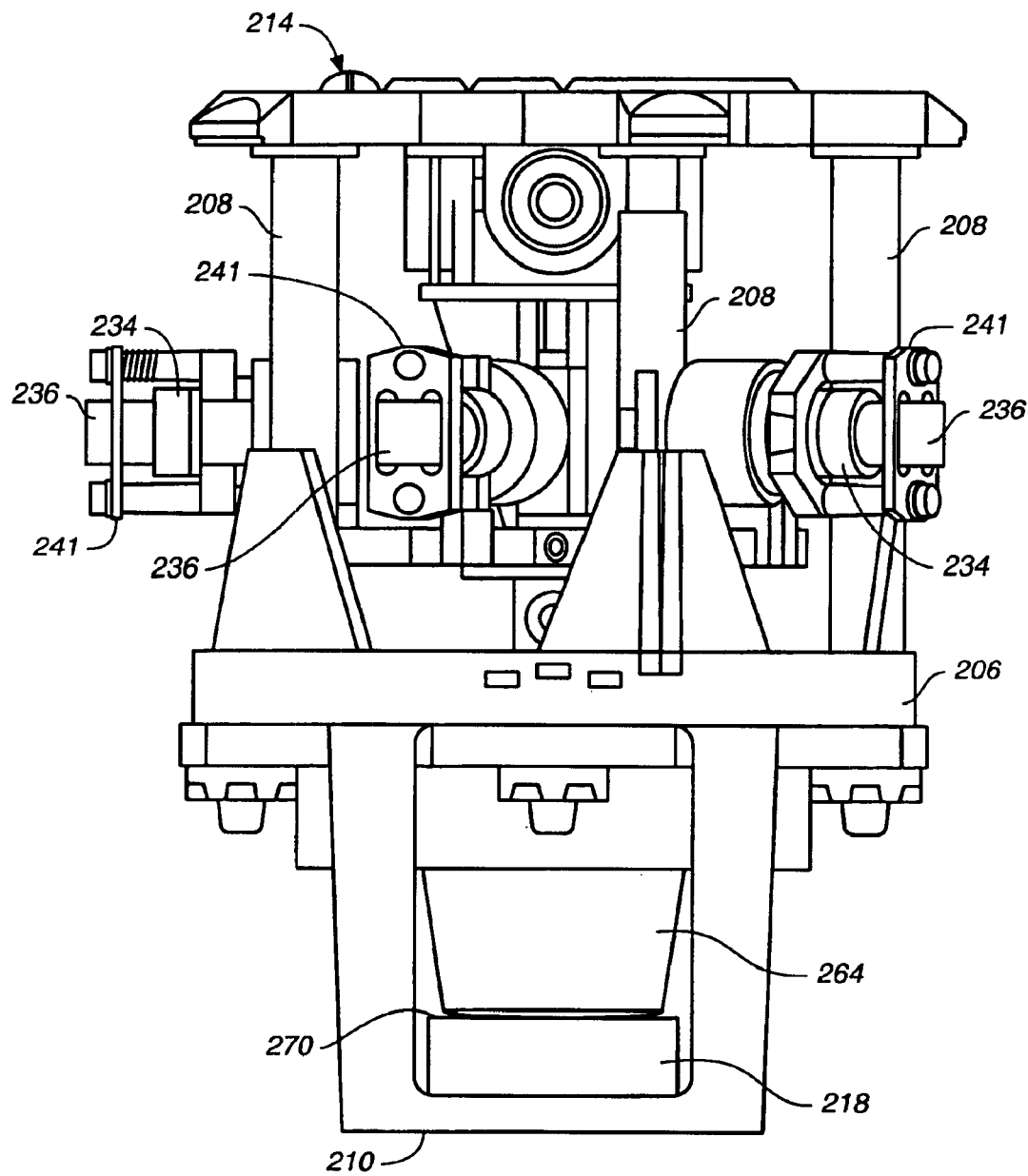
FIG._8

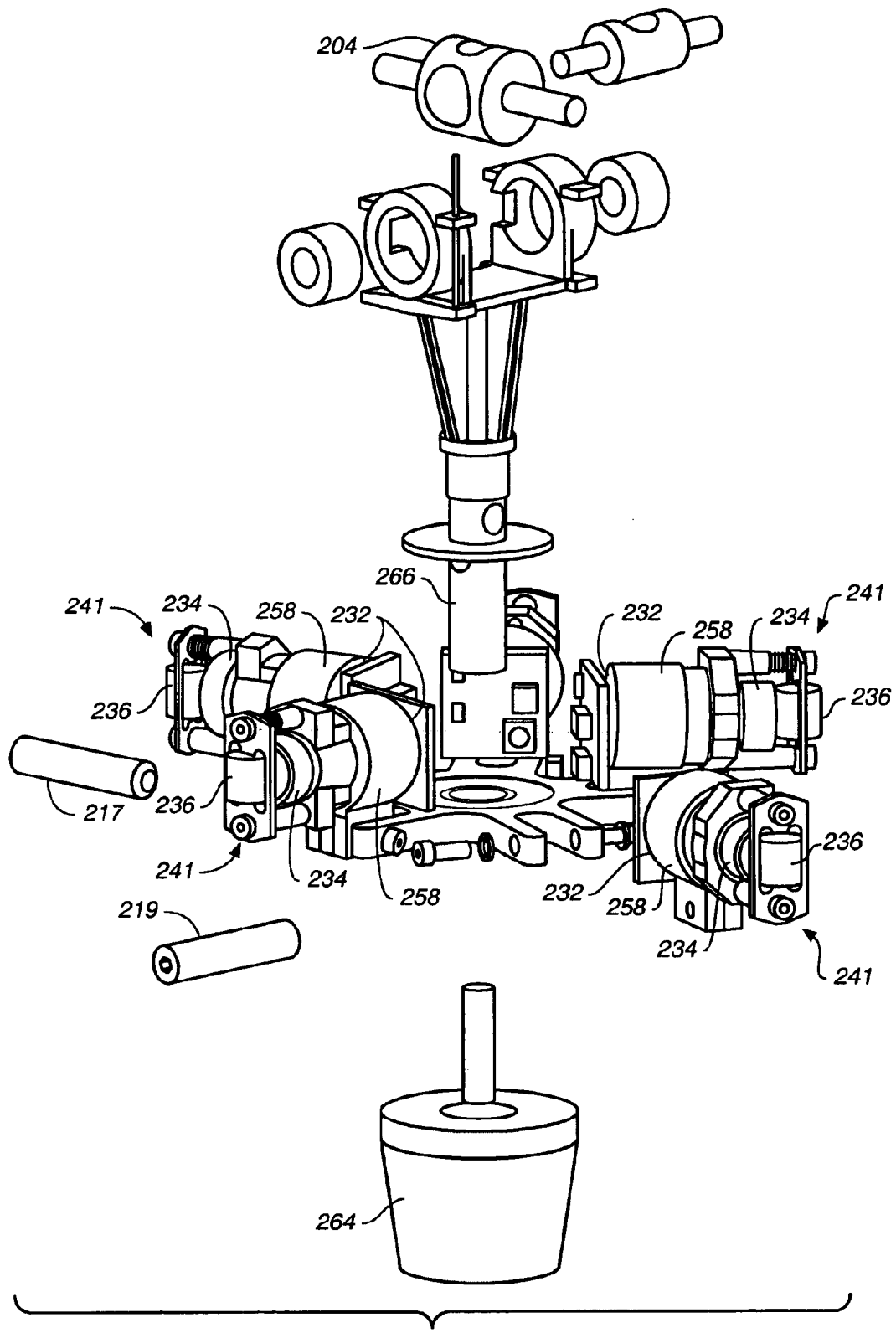
FIG._9

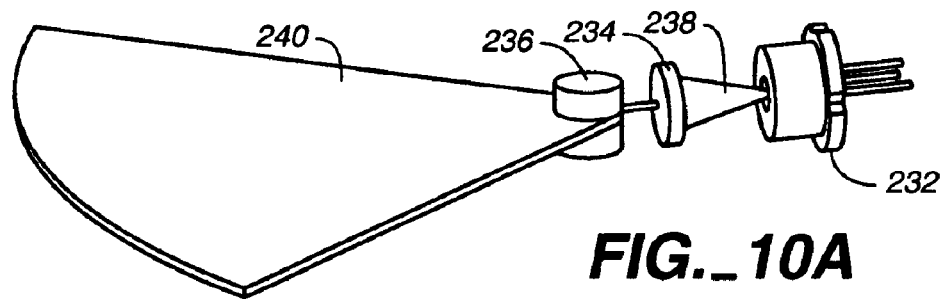
FIG._10A
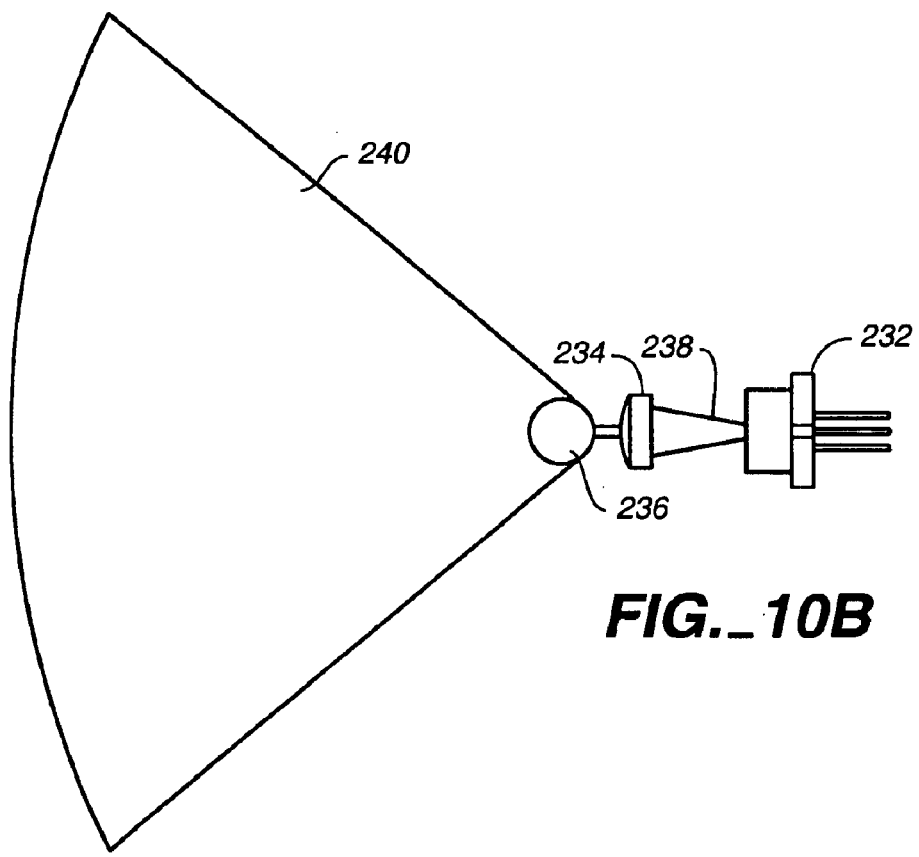
FIG._10B
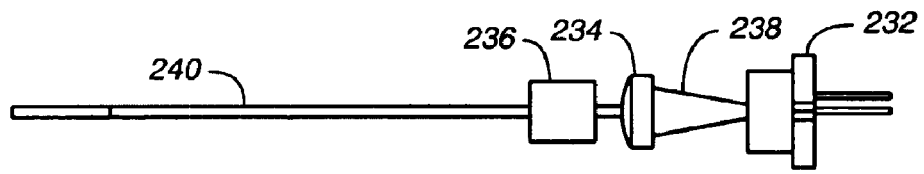
FIG._10C

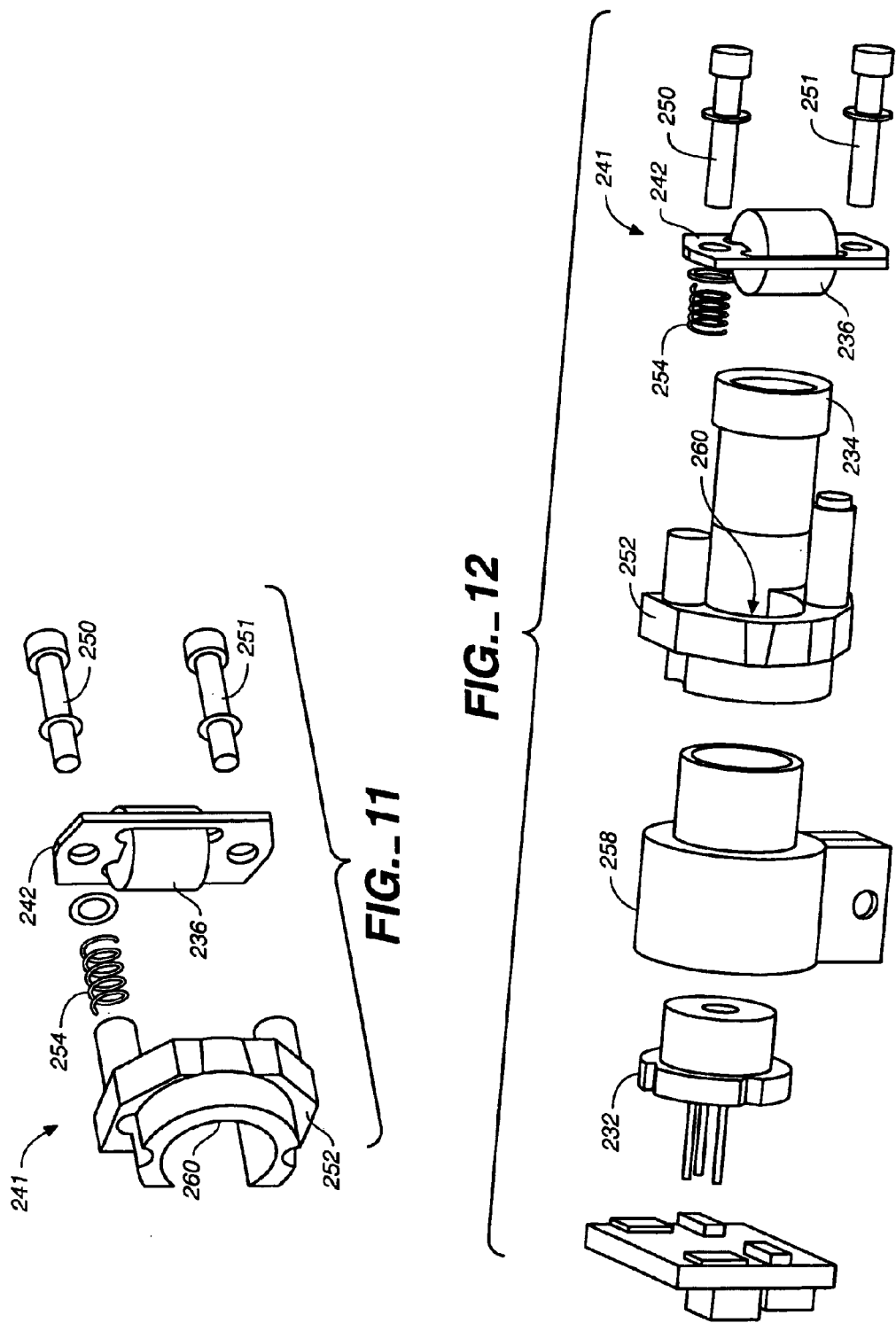

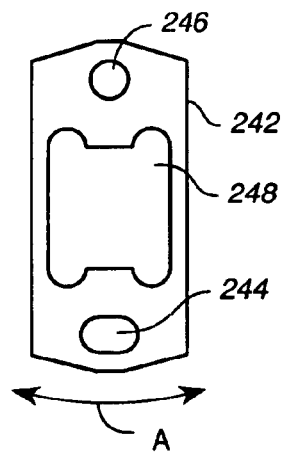
FIG._13A
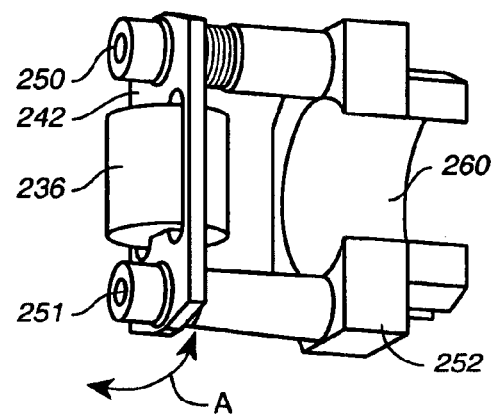
FIG._13B
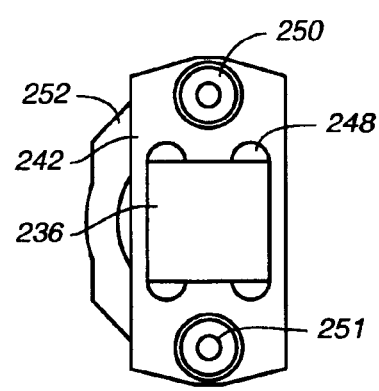
FIG._13C
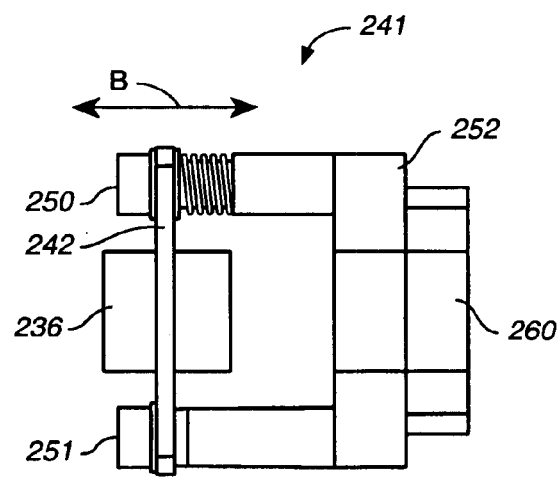
FIG._14

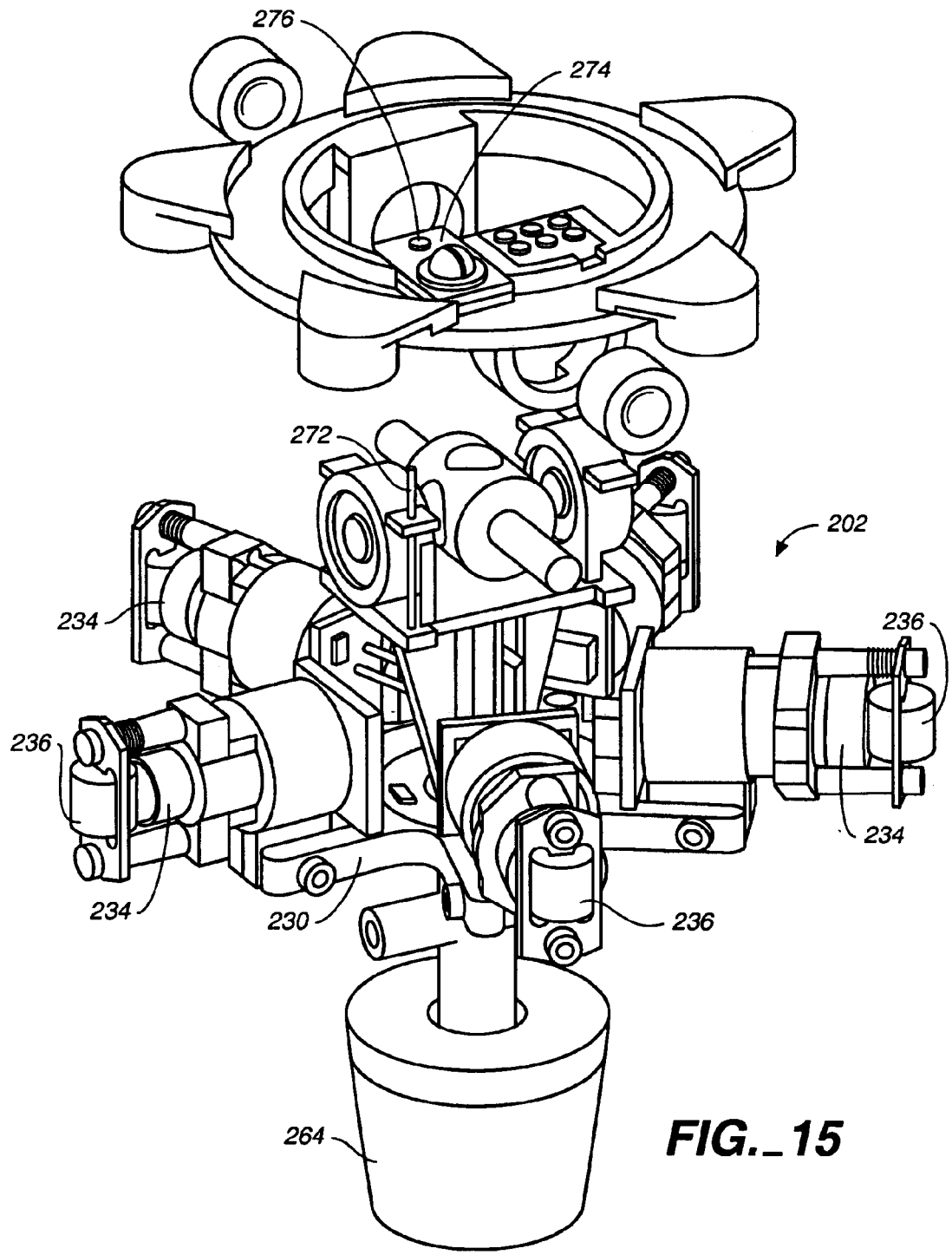
FIG._15

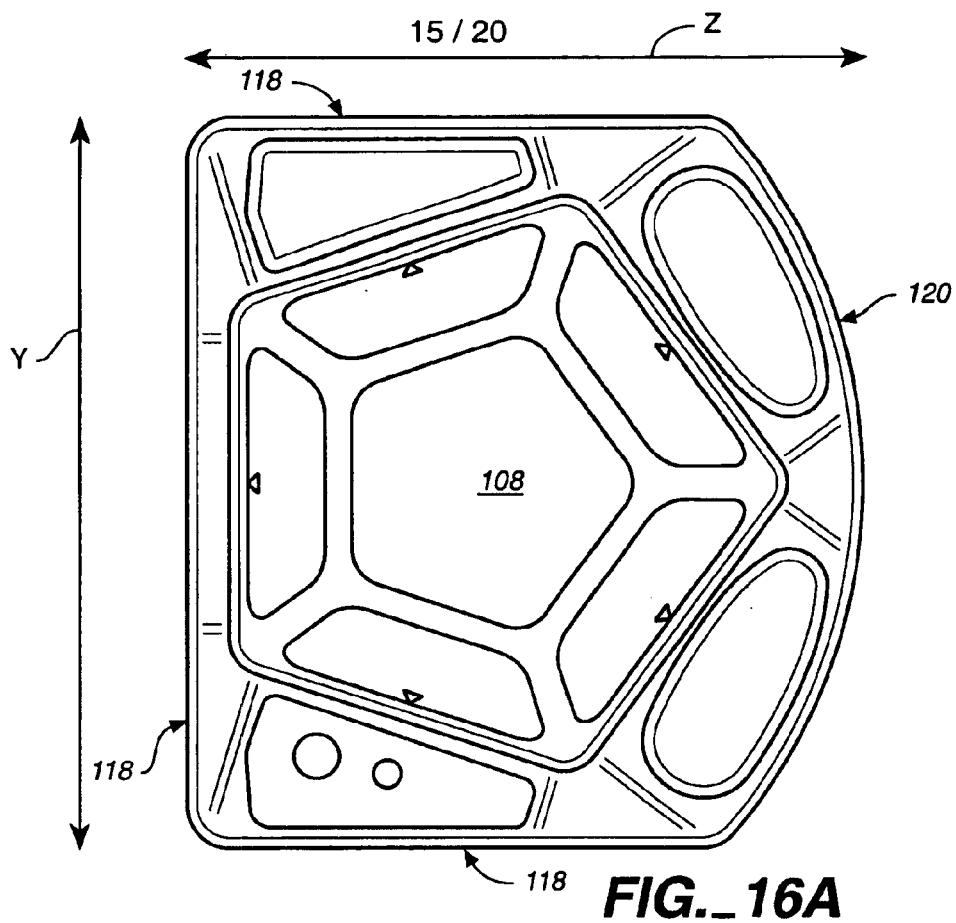
FIG.__16A
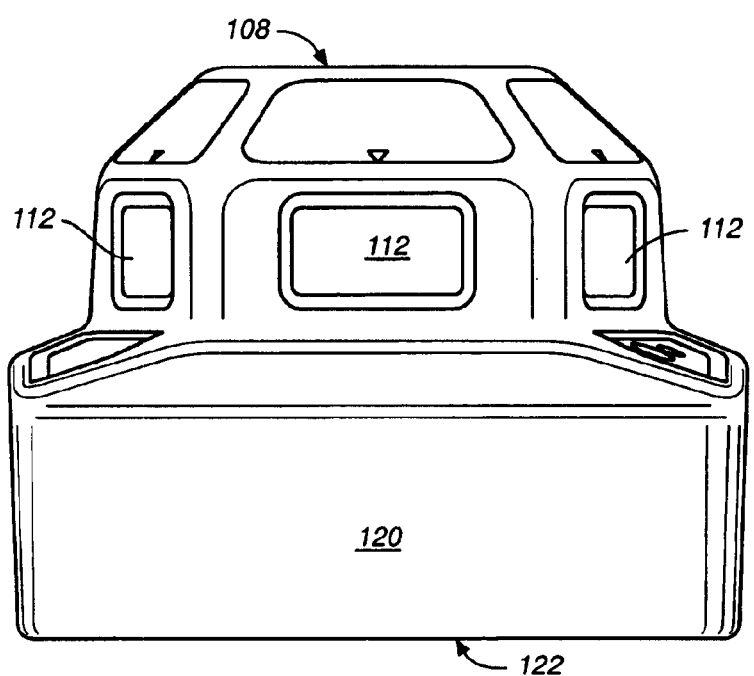
FIG.__16B

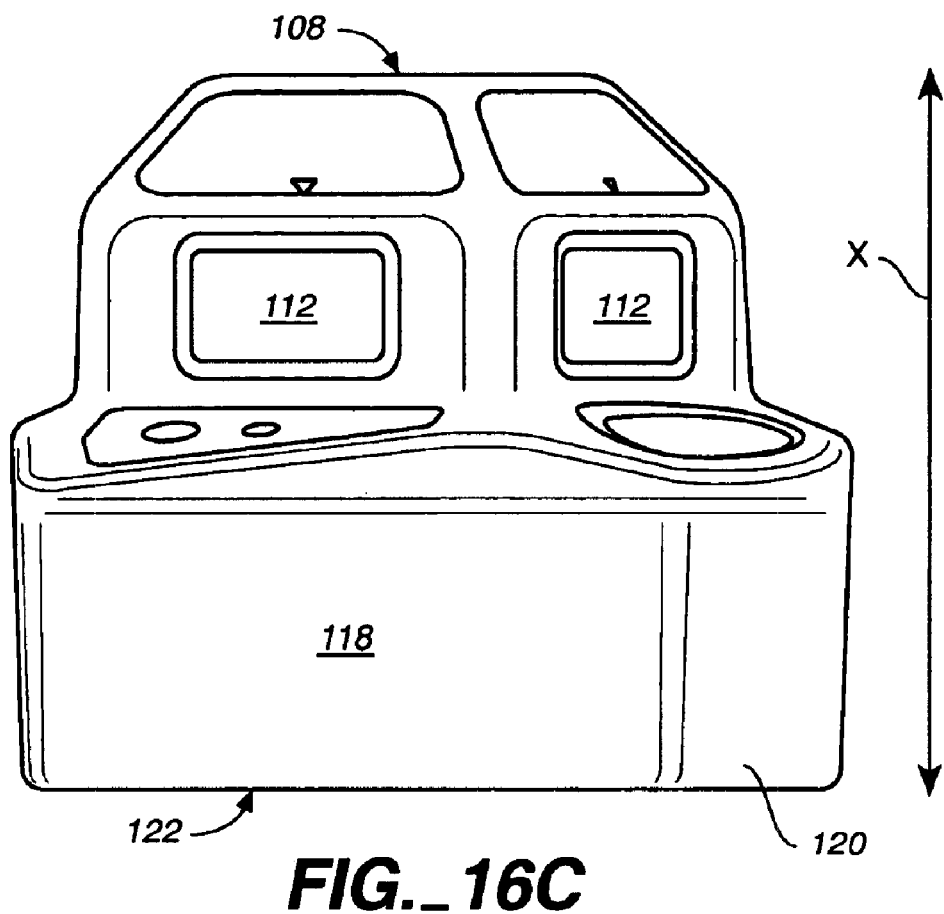
FIG._16C

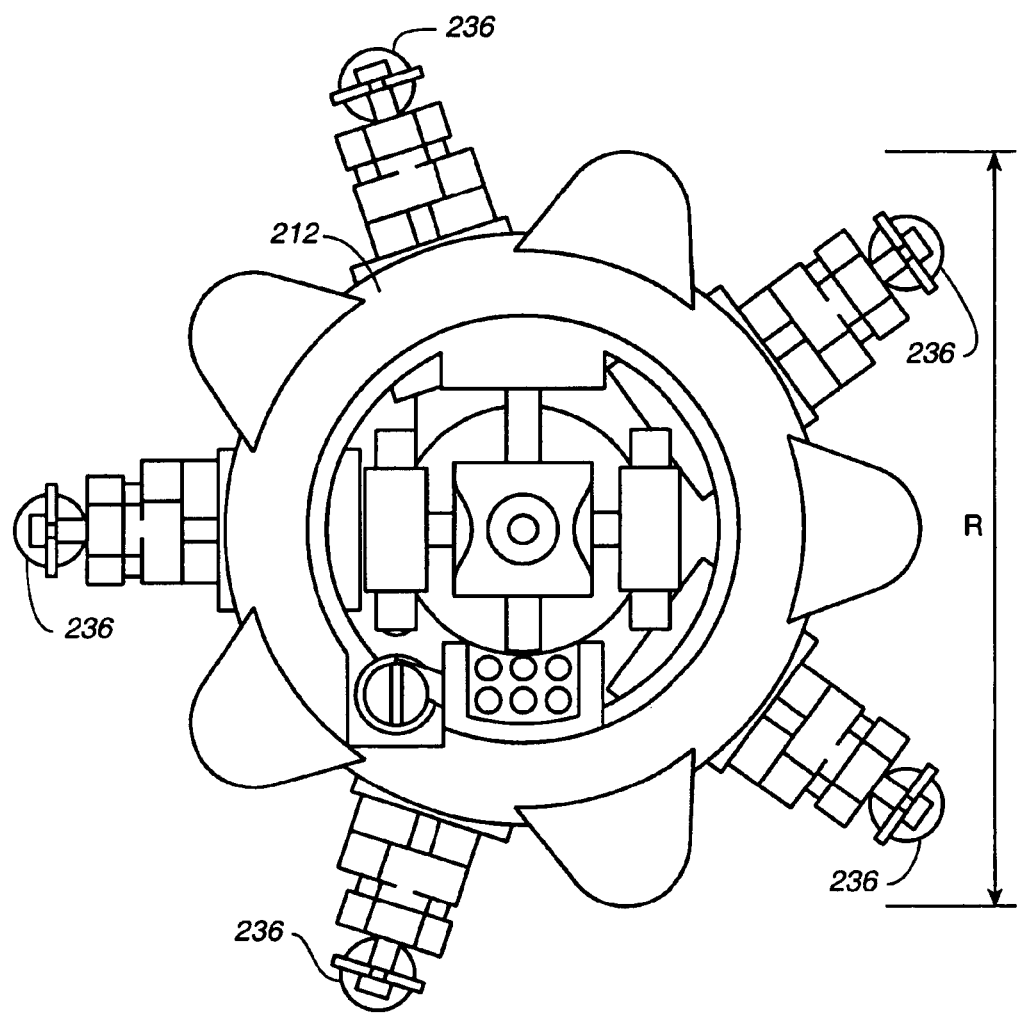
FIG._17A

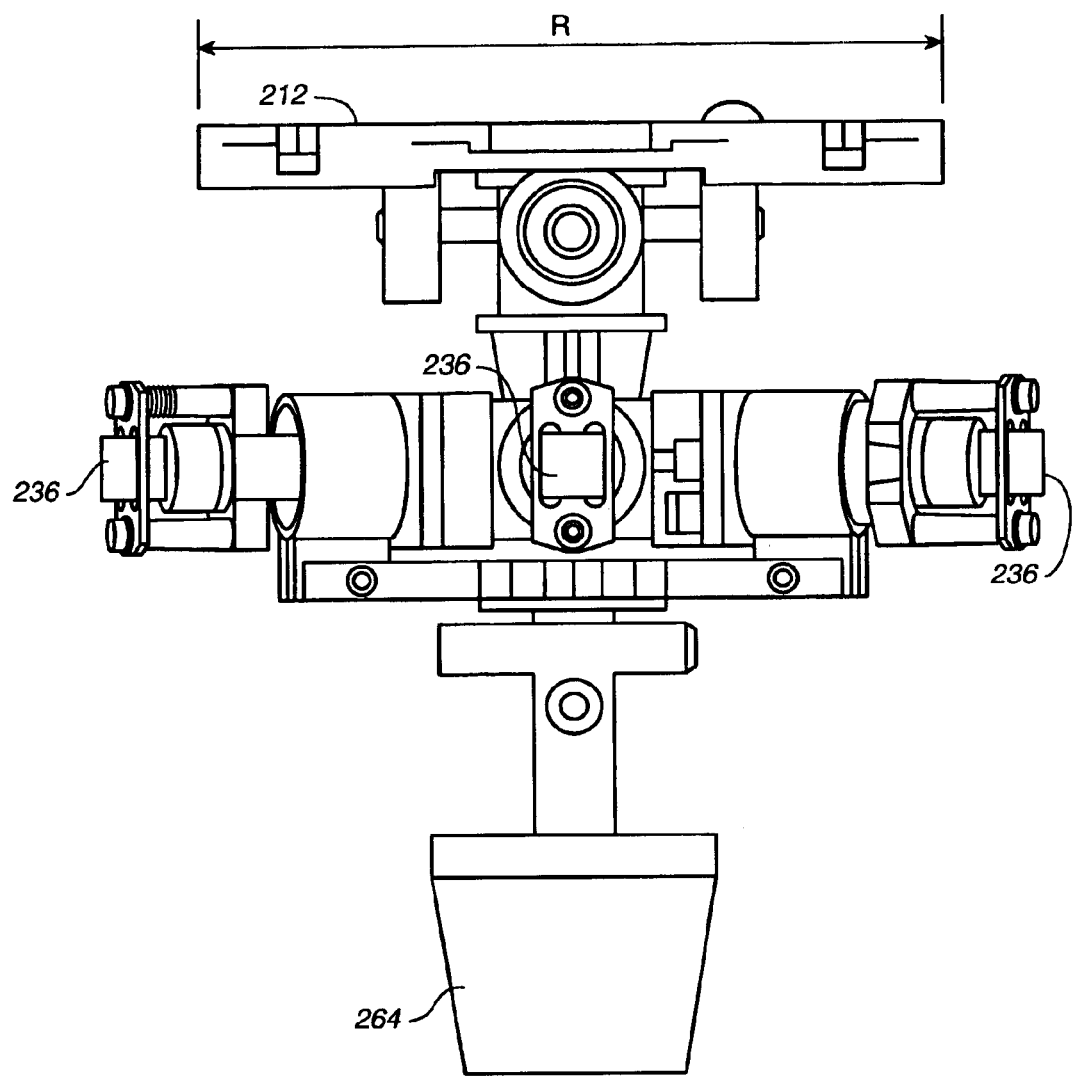
FIG._17B

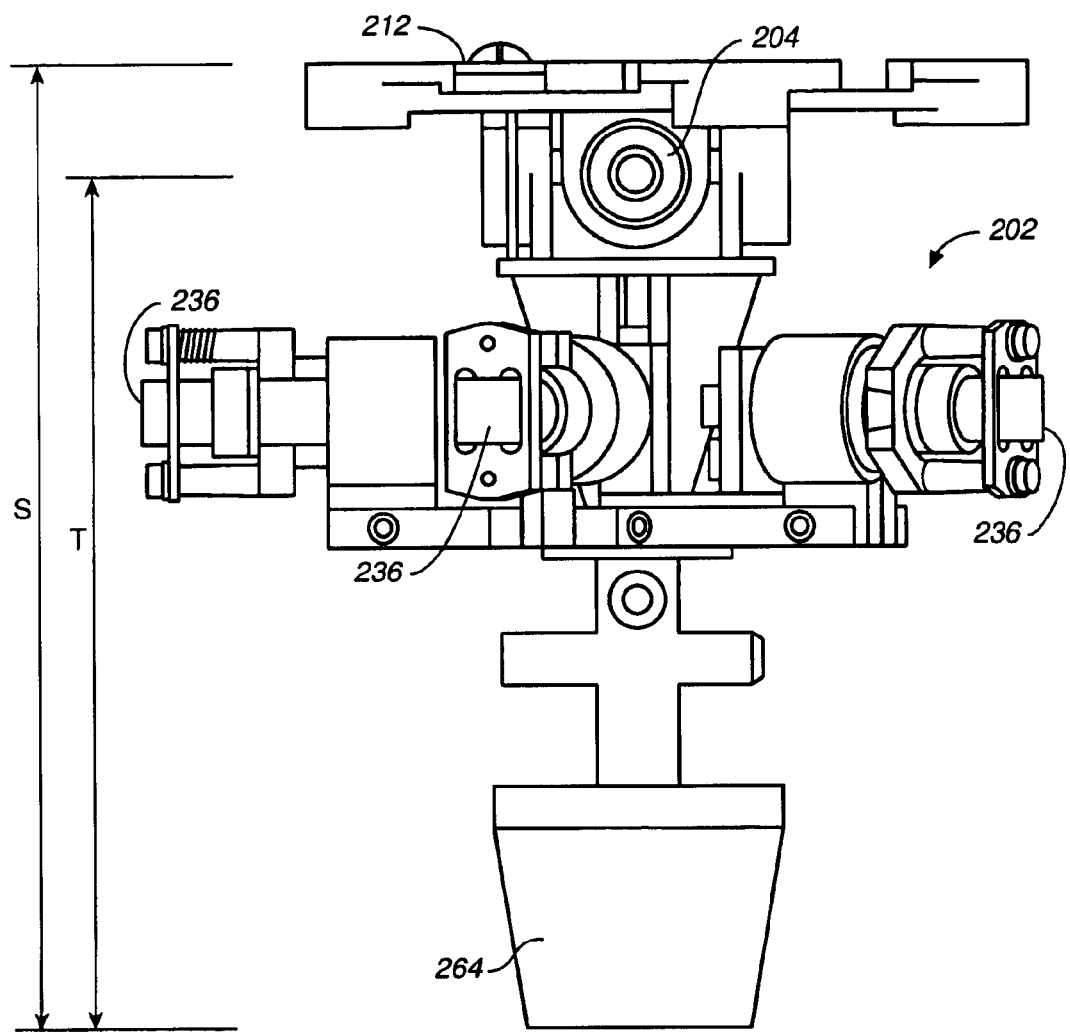
FIG._17C

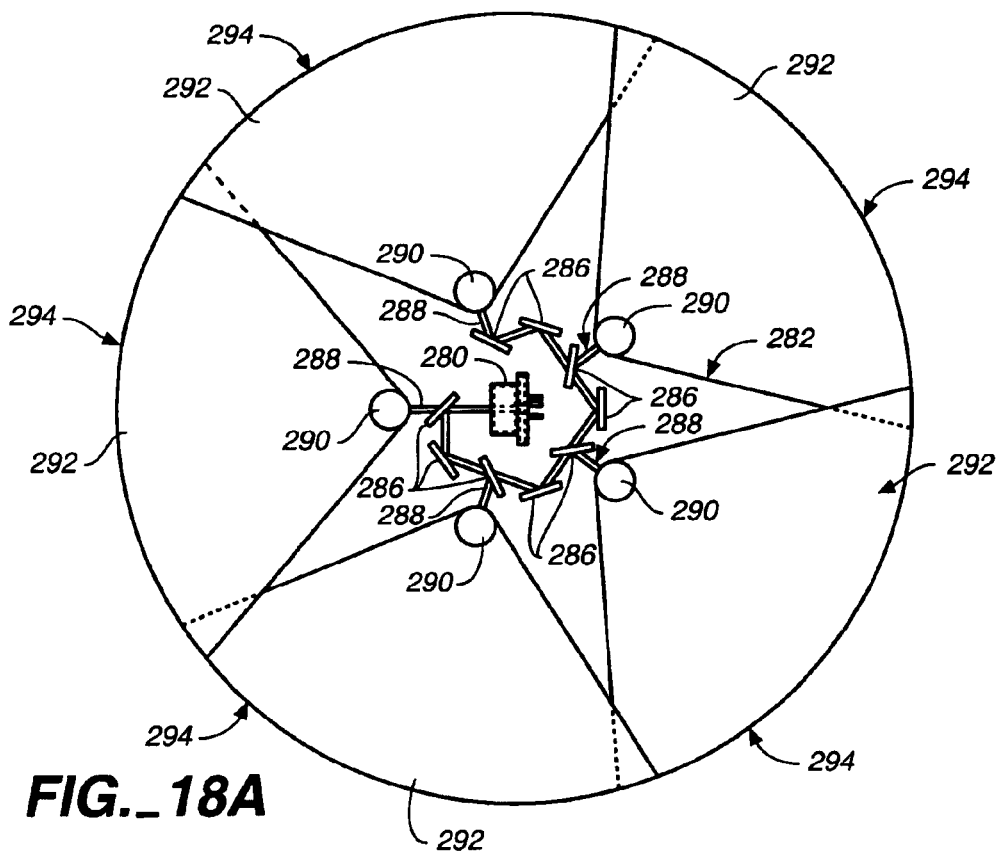
FIG._18A
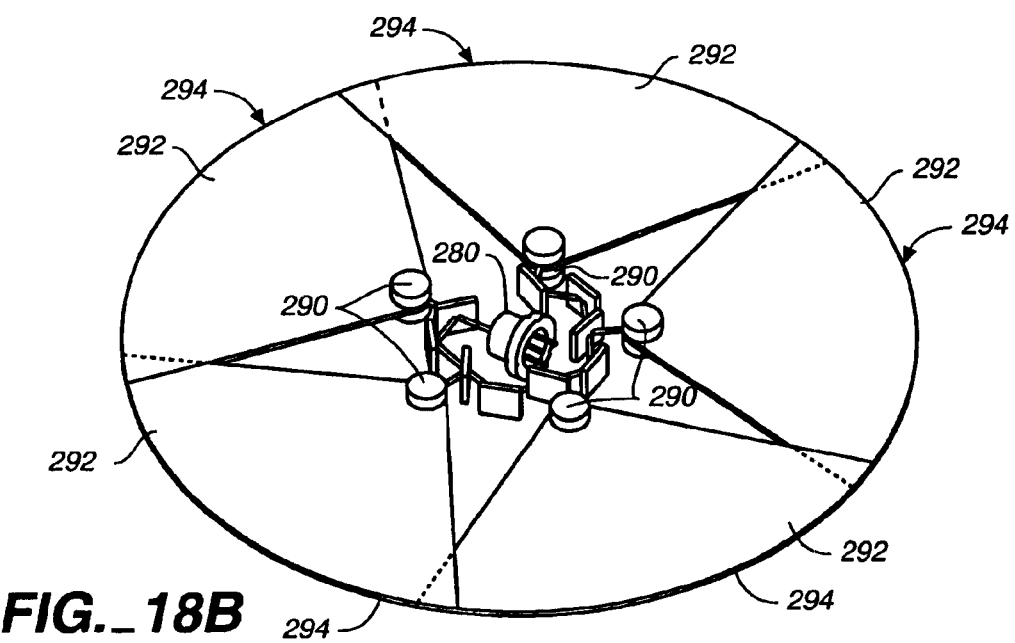
FIG._18B

APPARATUS FOR PRODUCING A REFERENCE PLANE

TECHNICAL FIELD

This invention relates to laser alignment devices.

BACKGROUND

Portable devices capable of indicating a reference plane have been useful in the construction and carpentry trades, as well as in other applications, for some time. The advent of laser technology has seen the use of portable laser emitting devices capable of indicating a level 360-degree reference plane. For example, in the construction industry, narrow beams of collimated light, in the form of laser beams are being increasingly used in connection with establishing and marking long, straight, level lines, such as those required for markings for walls, ceilings, and/or floors. Also, laser beam projectors and receivers are often used in the construction industry and in agricultural land leveling applications to ensure that a target area is graded in the proper or desired slope or grade. The laser beam projector is placed in a known position and one or more sensors are placed in the targeted area to sense the impingement of the laser beam.

A lase emitting device that can generate a 360-degree reference plane typically includes a laser source for generating a beam of collimated light and a rotating mechanism for rotating the beam of light about an axis to generate a plane of light.

In order to provide a substantially level plane, it is necessary to have a known orientation for the laser plane with respect to the true earth reference. Typically, the laser plane is oriented perpendicular to the earth's gravitational field, such as by manually leveling the mechanism, or by a self-leveling mechanism though a corresponding pair of servo motors and inclinometer sensors. Additionally, some laser plane generators are operable to orient the laser plane at an angle with respect to the level orientation by rotating each or both of the axes according to the desire slope. While such laser projectors facilitate generating a laser plane at a desired grade and orientation, the higher number of moving parts, including the rotating mechanism, within the laser projector may raise reliability concerns over a prolonged period of time. Also, when sensors are not used to sense the laser beam, the reference plane generated by the rotated laser beam can be difficult to see with the human eye as the beam of light is intermittently flashed along a surface.

In some prior art tools, a 360-degree reference plane can be generated without a rotating mechanism, a laser beam is directed at a conical surface, such as a right angle cone whose optical surface is aligned with the axis of the laser beam.

SUMMARY

The present invention provides apparatus and a method for projecting a reference plane. In general in one aspect, the invention features an apparatus to project a reference plane, including a laser to emit a light beam, a beam splitter to split the light beam into two or more resulting beams, and an optical element corresponding to each of the resulting beams to convert the resulting beams into respective projected lines. The projected lines can be used to indicate a reference plane that substantially spans greater than 90 degrees from a reference point.

Implementations of the invention may include one or more of the following. The reference plane can span approximately 180 degrees or 360 degrees from the reference point. The projected lines can overlap or be adjacent to each other to form a continuous reference plane. The laser can be a laser diode. The laser diode can be pulsed to screen out ambient light. The optical element can include a rod lens, a cylindrical lens or a hybrid lens. A collimator to collimate the light beam before it is split by the beam splitter can be included in the apparatus. The collimator can be a focus lens or an aspheric lens.

In general, in another aspect, the invention features an apparatus to form a reference plane, including at least two lasers within a housing, each laser configured and arranged to emit a light beam. A collimator to collimate each light beam, and an optical element corresponds to each laser to convert each of the collimated light beams into an output line. The output lines are projected from the housing in different directions along the same plane to only form a single reference plane that substantially spans approximately 140 degrees from a reference point.

In general, in yet another aspect, the invention features an apparatus to project a reference plane, including a housing and a projection unit within the housing. The projection unit includes five lasers each configured and arranged to emit a light beam and an optical element corresponding to each of the lasers to convert each light beam into an output line. The output lines are projected from the housing in different directions along the same plane to only form a single 360 degree reference plane.

Implementations of the invention may include one or more of the following. The projection unit can be pendulously suspended in the housing. A damper to dampen pendulous motion of the projection unit can be included in the apparatus. The damper can include a magnet mounted in the housing below the projection unit and a damping plate rigidly suspended from the projection unit, such that the damping plate is positioned above the magnet with a gap maintained therebetween sufficiently small that eddy currents are generated in the damping plate by motion thereof above the magnet. An error indicator to indicate when the housing is inclined such that the accuracy of the reference plane is compromised can be included in the apparatus.

In general, in still another aspect, the invention features an apparatus to form a reference plane, including at least one laser means to emit a light beam and means to convert the light beam into at least two output lines that are projected in different directions to only form a single reference plane that substantially spans greater than 90 degrees from a reference point.

In general, in another aspect, the invention features an apparatus to form a reference plane, including a projection unit pendulously suspended in a housing. The projection unit includes at least two lasers. Each laser is configured and arranged to emit a light beam, and a collimator is provided to collimate each light beam. An optical element corresponds to each laser to convert each of the collimated light beams into an output line, and a damper dampens pendular motion of the projection unit. The output lines are projected from the housing in different directions along the same plane to only form a single reference plane that substantially spans approximately 140 degrees from a reference point.

In general in yet another aspect, the invention features an apparatus to form a reference plane, including a housing and a projection unit pendulously suspended within the housing. The projection unit includes five lasers each configured and arranged to emit a light beam and an optical element corresponding to each of the lasers to convert each light beam into an output line. The output lines being projected from the housing in different directions along the same plane to only form a single 360 degree reference plane. The apparatus further includes a damper to dampen pendular motion of the projection unit.

In general, in another aspect, the invention features a method of forming a reference plane, including forming a light beam, splitting the light beam into at least two resulting beams, and converting the resulting beams into projected lines that indicate a reference plane that substantially spans greater than 90 degrees from a reference point.

Implementations of the invention may include one or more of the following. The reference plane can span approximately 180 degrees or 360 degrees from the reference point. The projected lines can be formed such that they overlap or are adjacent to each other to form a continuous reference plane. The light beam can be collimated prior to being split.

In general, in still another aspect, the invention features a method of forming a reference plane, including forming at least two light beams, collimating each light beam, and converting each collimated light beam into an output line that is projected from a housing in different directions along the same plane to only form a single reference plane that substantially spans approximately 140 degrees from a reference point.

In general, in another aspect, the invention features a method of forming a reference plane, including forming five laser beams and converting each laser beam into an output line that is projected from a housing in different directions along the same plane to only form a single 360 degree reference plane.

The details of one or more embodiments of the invention are set forth in the accompanying drawings and the description below. Other features and advantages of the invention will be apparent from the description and drawings, and from the claims.

DESCRIPTION OF DRAWINGS

FIG. 1 is a laser-based tool and a schematic representation of five output beams.

FIG. 2A shows a plan view of the laser-based tool and projected reference planes that are overlapped.

FIG. 2B is a plan view of the laser-based tool and projected reference planes that are adjacent.

FIG. 3A is a front view of the laser-based tool of FIG. 1 tilted to one side.

FIG. 3B is a side view of the laser-based tool of FIG. 1 tilted to one side.

FIG. 4 is a schematic representation of a laser-based tool projecting a reference plane onto a wall surface.

FIG. 5 is a schematic side view of the laser-based tool of FIG. 1.

FIG. 6 is shows a support frame of a laser-based tool.

FIG. 7 is an exploded view of the support frame of FIG. 6 and a view of a projection unit, of the laser-based tool.

FIG. 8 is a front view of the support frame and projection unit of FIG. 7.

FIG. 9 is an exploded view of the projection unit of FIG. 7.

FIGS. 10A–10C are perspective, plan, and side views, respectively, of the paths of laser beams emitted from laser diodes of the laser-based tool.

FIG. 11 is a partially exploded view of a mounting apparatus for a rod lens of the laser-based tool.

FIG. 12 is a view of the projection unit of FIG. 7.

FIG. 13A shows a front view of a plate included in the mounting apparatus of FIG. 11, and shown in FIGS. 13B and 13C.

FIG. 14 is a side view of the mounting apparatus of FIG. 11.

FIG. 15 is a view of the projection unit of FIG. 7 and a portion of the support frame of FIG. 6.

FIGS. 16A–16C are plan, front and side views, respectively, of a laser-based tool.

FIGS. 17A–17C are plan, front and side views, respectively, of a projection unit suspended from a portion of the support frame of the laser-based tool of FIGS. 16A–16C.

FIGS. 18A–18B are plan and perspective views, respectively, of a laser beam, a beam splitter and a projected reference plane.

Like reference symbols in the various drawings indicate like elements.

DETAILED DESCRIPTION

Referring to FIG. 1, a laser alignment tool 100 is shown capable of producing a level 360 degree reference plane. The tool 100 includes a housing 102 having an upper portion 104 and a lower portion 1106. The upper portion 104 of the housing includes windows 112 from which output beams 114 are projected. The beams 114 have a substantially planar arrangement with each other (i.e., the beams 114 all project on substantially the same plane) and form horizontal reference plane indicators. In one implementation, a reference plane indicator can be the image of a substantially straight line on the surface against which an output beam is projected. For example, the reference plane alignment indicators 116 shown in FIG. 1, which are substantially planar to one another, can be projected onto a surface such as a wall to form a horizontal line.

In the embodiment shown, the upper portion 102 of the housing includes a top 108 and side walls 110. The side walls 110 of the upper portion 104 include the windows 112. The lower portion 106 of the housing includes lower side walls 118, a curved lower front wall 120 and a base 122. However, other embodiments are possible, such as a housing including rounded walls or a cylindrically shaped housing.

FIG. 1A shows a plan view of the laser alignment tool 100 and the projected output beams 114. As shown in FIG. 2A, the reference plane alignment indicators 116 of the projected output beams overlap to form a continuous reference plane that spans 360 degrees. Alternatively, the output beams can be projected such that the reference plane alignment indicators 116 are adjacent to each other to form a continuous reference plane that spans 360 degrees, as shown in FIG. 2B.

In the embodiment shown, five output beams 114 are projected from the laser alignment tool 100 to produce a reference plane that spans 360 degrees. However, more generally, any number of output beams can be projected from the laser alignment tool to produce a reference plane that spans greater than 90 degrees. For example, two or more beams 114 can be used to produce corresponding horizontal reference plane indicators 116 that can be combined to indicate a reference plane that substantially spans greater than 90 degrees from a reference point as shown in FIG. 2A. As another example, three or more beams 114 can be used to produce corresponding horizontal reference plane indicators 116 that substantially spans greater than 180 degrees from a reference point as shown in FIG. 2B.

Referring again to FIG. 1, the tool 100 includes a projection system or unit for projecting the output beams 114 wherein a light source and all necessary optical components for projecting the output beams are mounted in a fixed relationship to each other, preferably in a single unit. A self-leveling feature includes pendulously suspending the projection unit from a support frame, for example, by a gimbal mount, or other methods of pendulous suspension, such as by a spring or wire flexures, as known in the art. The tool 100 is operated by setting the base 122 on a substantially level surface, however the self-leveling feature can allow for accurate level reference plane indicators when the tool 100 is inclined within a certain range from horizontal, referred to herein as the "accuracy range".

Referring to FIGS. 3A and 3B, the tool 100 is shown as tilted from side-to-side at an angle q from a horizontal plane 124 (FIG. 3A), and tilted from front-to-back at an angle q from the horizontal plane 124 (FIG. 3B). The accuracy range, meaning the range of angle q within which the tool 100 can provide accurate horizontal reference plane indicators, depends in part on the geometry of the tool 100. In the embodiment shown, where the tool 100 is sized to fit comfortably within the palm of a human hand, the accuracy range is between approximately 0° and plus or minus a maximum inclination in the range of approximately 4 to 7 degrees from horizontal. However, in another embodiment having a larger housing, for example, the accuracy range can be approximately plus or minus 0 to 9 degrees from horizontal.

The tool 100 can include an error indicator that operates to notify a user when the tool 100 is inclined from horizontal beyond the accuracy range, thereby compromising the integrity of the levelness of the horizontal reference plane indicators 116. The error indicator can include a cut-off mechanism that cuts off power to the projection system when the cut-off mechanism senses the housing is inclined beyond the accuracy range, ceasing projection of the output beams. An example of such a cut-off mechanism is described in U.S. Pat. No. 5,144,487, issued Sep. 1, 1992, for "Portable Laser Device for Alignment Tasks", assigned to the assignee of the subject application, the entire contents of which are hereby incorporated by reference. In this manner, the user is notified that the tool 100 is inclined beyond the accuracy range, and the tool 100 is effectively disabled, thus preventing the inadvertent use of inaccurate reference plane indicators. A further example of a cut-off mechanism is described below in reference to FIG. 15. In another embodiment, the error indicator can be a mechanism causing the output beams to blink.

The tool 100 can therefore be used to indicate a level 360 degree reference plane when placed on a surface with regard to the accuracy range. Referring to FIG. 4, a use for the tool 100 when inclined within the accuracy range is exemplified. In this example, a user requires reference plane indicators to be projected onto walls 130, 132 for any convenient purpose. The tool 100 can be placed on a table 134, such that the base 122 is substantially perpendicular with the walls 130, 132 and output beams 114 are directed toward the walls, providing reference plane indicators 116 on the surface of the walls. A variety of other uses in the construction and carpentry trades, for example, are also imaginable, such as reference plane indicators projected onto a ground surface for leveling purposes.

In one embodiment, the tool 100 can include a user-friendly interface for interacting with a user. Referring to FIG. 5, a side wall 110 of the tool 100 is shown. The side wall has an inclined portion 138, which includes a button 140 and a light 142. In this embodiment, a user can operate the tool 100 as follows. Starting with the tool 100 powered down, the light 142 is not illuminated, indicating the tool 100 is in the OFF position. A first press of the button 140 powers up the tool 100 and projects two or more horizontal linear output beams, providing reference plane alignment indicators that span substantially greater than 90 degrees from a reference point, with the error indicator activated. The light 142 shines green, indicating that the power is ON, and that the error indicator is activated.

A second press of the button 140 powers down the tool 100, and the light 142 does not shine, indicating the tool 100 is in the OFF position. The next press of the button 140 would start the above described cycle over again.

The user interface shown in FIG. 5 is one embodiment; however, any other convenient arrangement can be used to interact with a user, such as multiple buttons, an LCD or the like.

In one embodiment, the error indicator can be embodied in an implementation of the tool 100 as follows. Referring to FIGS. 6–9, the tool 100 can include a support frame 200, located within the tool housing 102, from which a projection unit 202 can be pendulously suspended by a gimbal mount 204.

Referring particularly to FIG. 6, the support frame 200 is shown without the projection unit 202, which would be suspended centrally within the support frame 200. The support frame 200 includes a generally ring-shaped, rigid portion 206 supporting, for example, five columns 208 and a base 210. An upper portion 212 is attached to the five columns 208, for example, by using screws, and provides a receiving surface for a gimbal mount 204 used to suspend the projection unit 202. The ring-shaped portion 206 and upper portion 212 can be made from a metal, such as aluminum, that is sufficiently rigid, yet lightweight. Other metals can be used, for example, stainless steel. A soft, padded member 214 is positioned over the upper portion to absorb impaction the tool 100 typical to its use in the construction and carpentry trades. An energy absorbent stop 216 is also positioned within the ring-shaped member to limit motion of the projection unit 202 when suspended within the support frame 200. The padded member 214 and stop 216 can be made of rubber, such as 40 durometer EPDM rubber. A magnet 218, used in a damping sys tem described further below, is affixed to the interior of the base of the ring-shaped portion 206.

Referring particularly to FIGS. 7 and 9, the projection unit 202 includes a central core portion 230 which houses five laser diodes 232. The laser diodes can be selected to emit visible light having a wavelength between about 630 to 650 nanometers (nm). The laser diode may be a model DL-4038-31 available from Sanyo Semiconductor Corporation in San Diego, Calif., or a model HL6332G available from Hitachi Semiconductor (America) Inc. of San Jose, Calif., both of which emit visible light at a wavelength of 635 nm at a power of 10 milliwatts.

Five collimators 234 are fixedly mounted to the central core 230 in alignment with the five laser diodes 232, respectively. In one implementation, each collimator can be a focus lens, such as model A375 available from Eastman Kodak Company of Rochester, N.Y., or an aspheric lens, such as model AC-210-T635 available from Anteryon of Eindhoven, The Netherlands. The five collimators 234 direct five collimated beams into five optical elements 236.

In the embodiment shown in FIG. 9, the projection unit 202 houses 5 laser diodes 232 to emit light for producing a 360 degree reference plane. However, the housing can include any number of laser diodes for emitting light to produce a reference plane that substantially spans greater than 90 degrees from a reference point. For example, the projection unit can house two laser diodes for emitting light to produce a reference plane that spans greater than 140 degrees, as shown in FIG. 2A.

Referring to FIGS. 10A, 10B, and 10C, an exemplary laser diode 232, collimator 234 and optical element 236 are shown outside the context of the projection unit 202. A diverging light beam 238 is emitted from the laser diode 232 and directed at the collimator 234, which collimates the beam and from which the collimated beam is immediately incident on the optical element 236 producing a linear output beam 240. In one implementation, the five optical elements 236 within the projection unit 202 are each a rod lens, such as a micro rod lens available from Edmund Industrial Optics of Barrington, N.J., or a 5 mm rod lens available from SOTA Precision Optics, Inc. of Orange, Calif. In other implementations, other types of optical elements can be used, for example, a cylindrical lens or a Kodak™ Hybrid LG-P9 available from Eastman Kodak Company of Rochester, N.Y. Passing a collimated beam through a rod or cylindrical lens has the effect of fanning the beam into a linear output beam. The fanned linear output beams 240 can project horizontal reference plane indicators. The brightness of the projected reference plane indicators can vary, depending in part on the strength of the light beam emitted from the laser diode. An implementation using the laser diodes described above can produce highly visible, bright reference plane indicators suitable for use both indoors and outdoors.

In one implementation, conventional techniques are applied to modulate (or pulse) the energy level of the laser diodes 232 to increase the peak power produced by the laser diodes. In one implementation, the laser energy in the horizontal reference planes is modulated at 8 kHz. By modulating the energy level of the laser diodes at 8 kHz, the laser alignment tool can be used in conjunction with receivers for detecting projected reference plane indicators in ambient light. For example, a receiver can include circuitry such that signals produced by ambient light and by noise energy are substantially reduced relative to the signal produced by the energy in the reference plane indicators. The energy level of the laser diodes can be modulated as described in U.S. Pat. No. 4,674,870, filed Oct. 18, 1985, and is incorporated herein by reference.

An important feature of a portable laser alignment device is to contain the device within a relatively small housing. The tool 100 is configured such that the tool 100 can fit comfortably within the palm of a human hand, and is sufficiently lightweight to allow a user to operate the tool while holding it in one hand, and conveniently carry it on a tool belt when not in use. The mounting devices used to mount the optical elements 236 to the projection unit 202 play an important role in allowing the tool 100 to be configured into such a small footprint. The position of an optical element in relation to a collimated beam incident on the optical element, and in relation to the central core 230 of the projection unit 202 is critical, in order to produce the image of a straight line free from distortions, such as bowing slightly in one direction resulting in a curved (a frown or smile) rather than straight line. Precisely positioning the optical element to produce a straight line requires a number of adjustments.

FIG. 11 shows a partially exploded view of a configuration of a mounting device 241 that can have a relatively small size, and that permits the required adjustments to precisely position an optical element to produce a straight line with relative ease, is shown. Referring to FIGS. 11 and 12, there are at least three adjustments required to position the optical element. For the purposes of illustrating the required adjustments, the optical element shown in FIGS. 11 and 12 corresponds to the five optical elements 236 shown in FIG. 7, which in the implementation shown is a rod lens.

Although the rod lens 236 may be centrally aligned with the collimator 234, an inherent error in the collimated beam, due to tolerances error of laser diode packaging, typically causes the beam to fall disproportionately on one side of an axis through the center of the rod lens 236. In this example, the rod lens 236 is oriented vertically and will produce a fanned linear horizontal output beam. If a vertical axis were drawn down the center of the rod lens 236, the collimated beam would be seen to fall disproportionately on one side or the other of the vertical axis. As a result, the projected linear output beam is unevenly distributed in relation to where a user is pointing the tool. That is, if a user points the tool at a particular point on a wall, for example, the projected linear output beam will be shorter to one side of the point than to the other side of the point.

The first adjustment to position the rod lens 236 requires laterally moving the rod lens 236 slightly to one side or the other to center the collimated beam, such that the beam is incident on the center of the rod lens 236. Referring to FIGS. 13A–13C, the rod lens 236 is mounted on a plate 242 having a central opening 248 for the rod lens 236. The plate 242 includes a slotted first opening 244 on one side of the central opening 248, and a substantially round second opening 246 on the opposite side of the central opening 248. The rod lens 236 can be mounted to the plate using, for example, an adhesive. The first and second openings 244, 246 are configured to receive connectors 250, 251 (FIG. 13B) for connecting the plate 242 to a base 252. The connectors can be, for instance, screws or pins. When the rod lens 236 is mounted within the plate 242 and the connectors 250, 251 are in place connecting the plate 242 to the base 252, the plate can be laterally displaced slightly from side to side (as represented by arrow "A") due to the slotted shape of the first opening 244, allowing some swivel movement of the plate relative to the connector 251. The slotted first opening 244 is configured to allow sufficient movement of the plate 242 to center the rod lens 236 in relation to the collimated beam incident on the rod lens 236.

The second required adjustment is necessary to ensure the collimated beam is perpendicular to the surface of the rod lens 236 upon which the beam is incident, so that the linear output beam emitted from the rod lens 236 will fall in one plane, to eliminate curvature of the linear output beam. A spring 254, shown in FIG. 11, is positioned between the plate 242 and the base 252, when the connectors 250, 251 are in place connecting the plate 242 and the base 252. FIG. 14I shows a side view of the mounting device 241 with the plate 242 secured to the base 252 and the spring 254 positioned about the connector 250 between the plate 242 and base 252. Because the spring 254 is between the plate 242 and base 252, the plate 242 can be moved in the direction of arrow B, for example, by tightening or loosening the connector 250 if the connector is a screw. The rod lens 236 can thereby be positioned by adjusting the connector 250 to move the plate 242 until the collimated beam is perpendicularly incident on the surface of the rod lens 236. In other embodiments the spring 254 can be other convenient means to allow for longitudinal displacement, such as a spring flexure or a threaded assembly.

The first and second adjustments described above are done once the mounting device 241 is itself mounted to the projection unit 202. As shown in FIG. 12, the mounting device 241 is positioned about a support 258 fixedly attached to the central core 230 of the projection unit 202. In one implementation, as shown, the support 258 is a cylinder sized to fit within the rounded interior surface 260 of the base 252. The mounting device 241 can be held in place by a snug fit, and once properly positioned, can be held permanently in place by any convenient means, such as an adhesive or a solder. Before the mounting device 241 is positioned on the support 258, the collimator 234 is positioned protruding from the support 258, such that when the mounting device is in place, the collimator 234 is positioned between the laser 232 (and the support 258) and the rod lens 236.

The third adjustment requires moving the mounting device 241 relative to the projection unit 202 on which it is mounted, to achieve true vertical of the mounting device relative to the projection unit 202.

The mounting device 241 is made of a rigid material, for example, a lightweight metal such as aluminum, although a second material, such as brass, can be used for the plate 242. Other suitable materials can also be used, such as stainless steel.

The projection unit 202 is designed such that when suspended from the gimbal mount 204 the projection unit 202 will balance so the linear output beams 240 are truly horizontal. In practice, manufacturing tolerances may be such that the projection unit 202 may not balance precisely as fabricated. Thus, it may be necessary to adjust the balance of the projection unit 202 after it has been assembled.

Referring to FIG. 9, showing an exploded view of the projection unit 202, in one implementation the projection unit 202 is balanced by inserting and adjusting one or more screws, such as two brass set screws 217, 219, in suitable openings or passage ways in the lower portion of the projection unit 202. Weight may thus be added to or removed from the projection unit 202 by adding or removing the screws 217, 219 and thereby adjusting the balance of the projection unit 202.

The projection unit 202 can include a damping system to limit pendular motion when the tool is set down on a surface, such as the damping system described in U.S. Pat. No. 5,144,487, previously incorporated herein by reference. Referring to FIGS. 7 and 8, such a damping system can include the magnet 218 secured to the inside of the base 210 of the support frame 200, and a copper damping plate 264 attached to a shaft 266 protruding downwardly from the projection unit 202. The damping plate 264 is formed and positioned such that a precise gap 270 is maintained at a predetermined width when the damping plate 264 is in motion over the magnet 218. The gap 270 is sufficiently small such that motion of the damping plate 264 causes eddy currents to be generated in the plate 264. Interaction of the eddy currents in the damping plate 264 with the magnetic field of the magnet 218 causes damping of pendular motion of the projection unit 202. The damping force may depend on the mass and thickness of the magnet 218, the dimension of the gap 270 and the thickness of the copper plate 264. Preferably the magnet 218 is a neodymium magnet approximately three-quarters of an inch in diameter and a quarter of an inch thick. The damping plate 264 is can be three-quarters of an inch thick and have a maximum diameter of 0.625 inches at its widest point and a minimum diameter of 0.500 at its narrowest point. Other types of magnets may be used and other arrangements of one or more magnets may be used to accomplish the damping function. In addition, other shapes and/or materials can be used for the damping plate. Alternatively, the "plate" can be an integral portion of the projection unit.

The laser diodes 232 can be powered by a rechargeable battery located in a battery compartment within the housing 102. The battery can be connected to the diodes 232 by a connector extending from the battery terminal. The connector can be an ultraflexible micro-miniature connector obtainable from New England Electric Wire Company of Lisbon, N.H. In one implementation, the connector is lead to the switch 140. The connector is then lead through the center of the gimbal mount 204 and connected to the laser diodes 232. Leading the connector through the gimbal mount 204 is one technique to ensure the connector has a negligible effect on the balance of the projection unit 202.

Provision is made to prevent excessive motion of the projection unit 202 when the tool 100 is set down on a surface which is far from level. Referring to FIGS. 6 and 7, the energy absorbent stop 216 is positioned such that when the tool 100 is inclined at approximately plus or minus seven degrees (7°) or greater from the horizontal, the damping plate 264 contacts the stop 216, thus limiting further relative movement between the projection unit 202 and the support frame 200.

As discussed above, the tool 100 can include a cut-off switch that will cut off power to the laser diodes 232 when the housing 102 is inclined in any direction plus or minus a predetermined angle from horizontal. In the embodiment shown, the predetermined angle can be approximately plus or minus 7°, however, the angle can vary depending on the geometry of the tool 100, and, as already discussed above, can be in a range of approximately plus or minus 4 to 9 degrees.

Referring to FIG. 15, a partially exploded view of a portion of the support frame 200 and the projection unit 202 and is shown. The cut-off mechanism can include a wire flexure 272 attached to and protruding above the upper portion of the projection unit 202. The cut-off mechanism further includes a small metal plate 274 attached to the top of the support frame 200. The plate 274 includes an aperture 276. The aperture 276 is sized and positioned such that the wire flexure 272 projects through the center of the aperture 276 when the projection unit 202 is suspended from the support frame 200. The wire flexure 272 carries a charge from the projection unit 202, which is charged due to the rechargeable battery used to power the laser diodes 232. When the housing 102 is inclined beyond the accuracy range, for example 7° from horizontal, the wire flexure 272 contacts the metal interior of the aperture 276, which in essence behaves as a contact switch, indicating to the laser power drive that power to the laser diodes 232 should be cut-off which can be accomplished, in one example, by conventional digital logic. Other embodiments are possible using different cut-off switches, for example, an omni-directional mercury switch.

As discussed above, using the mounting device used to mount the optical elements to the projection unit, combined with the damping system, advantageously allows the tool 100 to be embodied within a relatively compact housing with a relatively low overall weight. Referring to FIGS. 16A–16C, in one embodiment, the tool 100 can be dimensioned to have a height X of approximately 3.83 inches, a width Y of approximately 4.9 inches and a depth Z of approximately 4.6 inches. Referring to FIGS. 17A–17C, the upper portion of the support frame 202 can have a width R of approximately 2.0 inches. The distance S between the top of the upper portion of the support frame 202 and the bottom of the damping plate 264 is approximately 2.8 inches, and the distance T from the midpoint of the gimbal mount 204 to the bottom of the damping plate 264 is approximately 2.52 inches. In this configuration, the tool 100 can have a tool weight of approximately 15.8 ounces (without batteries).

FIGS. 18A–18B show a laser diode 280 for generating a beam and a beam splitter assembly 282. In one implementation, the laser diode 280 and the beam splitter assembly are used within a housing like the housing 102 to generate reference plane indicators. The beam splitter assembly includes beam splitters 286 for generating light beams 288. The light beams 288 are directed towards collimators (not shown) and optical elements 290 for producing output beams 292 and corresponding reference plane indicators 294. As described above, the collimators (not shown) can each be a focus lens or an aspheric lens. Also, the optical elements 290 can each be a rod lens, a cylindrical lens, or a hybrid lens.

In the embodiment shown in FIGS. 18A–18B, five reference plane indicators 294 form a 360 reference plane. Other embodiments are possible, for example, the laser diode 280 and the beam splitter assembly 282 can be used to project only two output beams which produce corresponding horizontal reference plane indicators 116 that substantially spans greater than 90 degrees from a reference point. As another example, the laser diode 280 and the beam splitter assembly 282 can be used to project three output beams which produce corresponding horizontal reference plane indicators 292 that substantially spans greater than 180 degrees from a reference point. Also, more than one laser diode can be used in conjunction with a beam splitter assembly to form a reference plane that spans substantially greater than 90 degrees from a reference point. The output beams 292 can be projected such that the reference plane alignment indicators 294 are adjacent or overlap each other to form a continuous reference plane that spans greater than 90 degrees from a reference point.

A number of embodiments of the invention have been described. Nevertheless, it will be understood that various modifications may be made without departing from the spirit and scope of the invention. For example, the tool 100 can include other self-leveling features such as the use of bubble vial levels incorporated into the housing 102 for manual leveling adjustments. The self-leveling feature can also include controlled servos and/or stepper motors for automatic or manual leveling adjustments. Accordingly, other embodiments are within the scope of the following claims.

What is claimed is:

1. An apparatus to project a reference plane comprising:
 a housing; and
 a projection unit within the housing, the projection unit including:
  five lasers each configured and arranged to emit a light beam;
  a collimator corresponding to each of the lasers to collided each light beam;
  an optical element corresponding to each of the lasers to convert each collimated light beam into an output line, the output lines being projected from the housing in different, substantially constant directions along the same plane to only form a single 360 degree reference plane; and
  a mounting device corresponding to each of the optical elements to mount the optical element to the projection unit, each mounting device operable to position the optical element to produce a substantially straight output line, each mounting device including;
   a plate onto which the optical element is mounted, the plate having at least one slotted opening for laterally displacing the optical element such that a corresponding collimated light beam is incident substantially on a center of the optical element.

2. The apparatus of claim 1, wherein each mounting device further includes a spring positioned next to the plate, the spring permitting the plate to be adjusted so that a corresponding collimated beam is substantially perpendicularly incident on a surface of the optical element.

3. The apparatus of claim 2, wherein each mounting device is further operable to be positioned relative to the projection unit to achieve substantially true vertical orientation of the mounting device relative to the projection unit.

* * * * *